United States Patent
Kim et al.

(10) Patent No.: US 12,189,430 B2
(45) Date of Patent: Jan. 7, 2025

(54) METHOD FOR CONTROLLING FLEXIBLE DISPLAY AND ELECTRONIC DEVICE SUPPORTING THE SAME

(71) Applicant: SAMSUNG ELECTRONICS CO., LTD., Suwon-si (KR)

(72) Inventors: Sukdong Kim, Suwon-si (KR); Myunghoon Kwak, Suwon-si (KR); Moonsun Kim, Suwon-si (KR); Junwoo Choi, Suwon-si (KR); Changryong Heo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 2 days.

(21) Appl. No.: 18/087,406

(22) Filed: Dec. 22, 2022

(65) Prior Publication Data

US 2023/0127541 A1    Apr. 27, 2023

Related U.S. Application Data

(63) Continuation of application No. PCT/KR2021/015928, filed on Nov. 4, 2021.

(30) Foreign Application Priority Data

Nov. 6, 2020  (KR) .......................... 10-2020-0147989
Feb. 1, 2021  (KR) .......................... 10-2021-0014286

(51) Int. Cl.
*G06F 1/16*    (2006.01)

(52) U.S. Cl.
CPC .......... *G06F 1/1652* (2013.01); *G06F 1/1624* (2013.01); *G06F 1/1677* (2013.01); *G06F 1/1683* (2013.01)

(58) Field of Classification Search
CPC ..................................................... G06F 1/1652
See application file for complete search history.

(56) References Cited

U.S. PATENT DOCUMENTS

| | | |
|---|---|---|
| 9,076,102 B2 | 7/2015 | Lim |
| 9,298,297 B2 | 3/2016 | Kim et al. |
| (Continued) | | |

FOREIGN PATENT DOCUMENTS

| | | |
|---|---|---|
| KR | 10-2013-0083268 A | 7/2013 |
| KR | 10-2016-0097033 A | 8/2016 |
| (Continued) | | |

OTHER PUBLICATIONS

Extended European Search Report dated Feb. 1, 2024 for EP Application No. 21889592.8.

(Continued)

*Primary Examiner* — Gustavo Polo
(74) *Attorney, Agent, or Firm* — Nixon & Vanderhye P.C.

(57) ABSTRACT

An electronic device may include a first housing, a second housing, a flexible display including a first area and a second area, wherein the first area is exposed for view to the outside of the electronic device in a first state, and when the first state is switched to a second state according to movement of the second housing with respect to the first housing, at least a portion of the second area may be exposed for view to the outside of the electronic device together with the first area, and a processor. The processor may be configured to, in the first state, supply power related to driving of the flexible display to a first portion of the second area, the first portion being adjacent to the first area and not exposed for view to the outside through a front surface of the electronic device.

20 Claims, 17 Drawing Sheets

(56) References Cited

U.S. PATENT DOCUMENTS

| | | |
|---|---|---|
| 10,140,947 B2 | 11/2018 | Song et al. |
| 10,268,253 B2 | 4/2019 | Liu |
| 10,359,900 B2 | 7/2019 | Hong et al. |
| 10,571,968 B2 | 2/2020 | Zhang et al. |
| 10,684,714 B2 | 6/2020 | Seo et al. |
| 10,705,716 B2 | 7/2020 | Sang et al. |
| 10,706,785 B2 | 7/2020 | Kim |
| 11,217,166 B2 | 1/2022 | Her et al. |
| 11,252,826 B2 | 2/2022 | Park et al. |
| 2013/0131887 A1 | 5/2013 | Park |
| 2016/0307545 A1 | 10/2016 | Lee et al. |
| 2018/0081473 A1 | 3/2018 | Seo et al. |
| 2019/0197960 A1* | 6/2019 | Kim ................. G09G 3/035 |
| 2019/0227600 A1 | 7/2019 | Hirakata et al. |
| 2019/0259341 A1 | 8/2019 | Park et al. |
| 2019/0261519 A1 | 8/2019 | Park et al. |
| 2020/0020255 A1 | 1/2020 | Yoon |

FOREIGN PATENT DOCUMENTS

| | | |
|---|---|---|
| KR | 10-2018-0043433 A | 4/2018 |
| KR | 10-2019-0079241 A | 7/2019 |
| KR | 10-2019-0088800 A | 7/2019 |
| KR | 10-2019-0100577 A | 8/2019 |
| KR | 10-2019-0101184 A | 8/2019 |
| KR | 10-2020-0022410 A | 3/2020 |

OTHER PUBLICATIONS

Korean Office Action dated Sep. 15, 2024 for KR Application No. 10-2021-0014286.

\* cited by examiner

METHOD FOR CONTROLLING FLEXIBLE DISPLAY AND ELECTRONIC DEVICE SUPPORTING THE SAME

CROSS-REFERENCE TO RELATED APPLICATIONS

This application is a continuation of International Application No. PCT/KR2021/015928 designating the United States, filed on Nov. 4, 2021, in the Korean Intellectual Property Receiving Office and claiming priority to Korean Patent Application Nos. 10-2020-0147989 and 10-2021-0014286, the disclosures of which are incorporated by reference herein in their entireties.

BACKGROUND

Field

Various embodiments relate to a method for controlling power of a flexible display and an electronic device supporting the same.

Description of Related Art

An electronic device may display a screen in a display area of a flexible display. For example, the electronic device may display a screen in a first area exposed to the outside of the electronic device in a first state (for example, display area reduction state) of the flexible display, or may display a screen in the first area and in at least a part of a second area extending from the first area in a second state (for example, display area expansion state) of the flexible display.

When an electronic device displays a screen in a first area of a flexible display in the first state, power related to driving of the flexible display (for example, flexible display panel current) needs to be supplied to the entire flexible display, and this may unnecessarily waste power with regard to the second area of the display. Such unnecessary power waste may consequently reduce the electronic device use time.

In order to reduce or prevent unnecessary power waste related to the second area of the flexible display, the electronic device may block power regarding a part of the second area of the flexible display, which is not exposed to the outside of the electronic device. However, if the first state switches to the second state, the electronic device needs to supply power to the portion, which has previously been supplied with no power, such that the same is exposed to the outside of the electronic device for screen display, and this inevitably slows down the screen display.

SUMMARY

Various embodiments disclosed herein may provide a flexible display control method for supplying power related to driving of a flexible display, and an electronic device supporting the same.

According to an embodiment disclosed herein, an electronic device may include a first housing, a second housing coupled with the first housing so as to be movable with respect to the first housing, a flexible display including a first area and a second area extending from the first area, wherein the first area is exposed for view to an outside of the electronic device in a first state, and when the first state is switched to a second state according to movement of the second housing with respect to the first housing, at least a portion of the second area is exposed for view to the outside of the electronic device together with the first area, a display driver IC for driving the flexible display, and a processor electrically connected to the flexible display, wherein the processor is configured to, in the first state, supply power related to driving of the flexible display to a first portion of the second area, the first portion being adjacent to the first area and not exposed for view to the outside through a front surface of the electronic device.

In addition, according to an embodiment disclosed herein, a method for controlling a flexible display may include, when a first area of the flexible display is exposed for view to an outside through a front surface of an electronic device according to a first state, supplying power related to driving of the flexible display to a first portion of a second area of the flexible display, the first portion being adjacent to the first area and not exposed for view to the outside through the front surface of the electronic device.

According to various embodiments disclosed herein, a flexible display control method and an electronic device supporting the same may divide the second area of the flexible display into multiple parts and may independently supply power related to driving of the display to each of the multiple parts according to the first or second state, thereby increasing the electronic device use time.

In addition, according to various embodiments disclosed herein, a flexible display control method and an electronic device supporting the same may supply power related to driving of the display to an area adjacent to the first area and/or second area of the flexible display, which is exposed for view to the outside, according to the first or second state, thereby improving user responsiveness.

Various other advantageous effects identified directly or indirectly through the disclosure may be provided.

BRIEF DESCRIPTION OF THE DRAWINGS

In relation to the description of the drawings, the same or similar reference numerals may be used with respect to the same or similar elements. Additionally, the above and other aspects, features and advantages of certain embodiments of the present disclosure will be more apparent from the following detailed description, taken in conjunction with the accompanying drawings, in which.

In relation to the description of the drawings, the same reference numerals may be assigned to the same or corresponding components.

DETAILED DESCRIPTION

Hereinafter, various embodiments of the disclosure are described with reference to the accompanying drawings. However, this is not intended to limit the disclosure to specific embodiments, and should be understood to include various modifications, equivalents, and/or alternatives to embodiments of the disclosure.

Figure 1A:
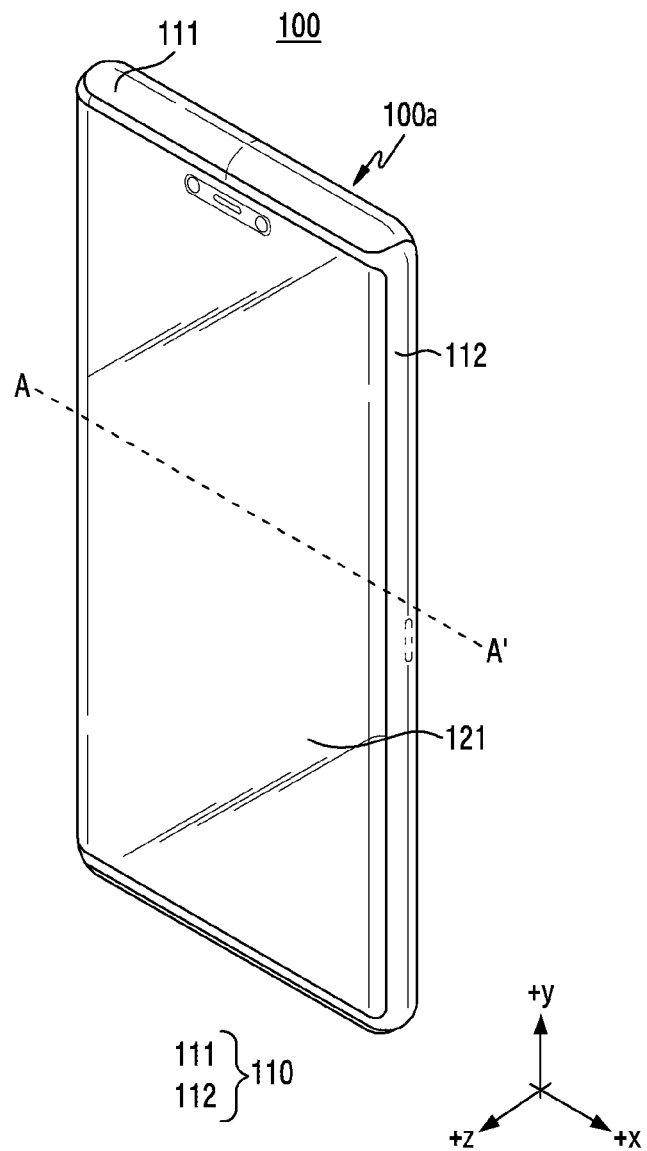
FIG. 1A illustrates a front surface of an electronic device in a first state (e.g., a display area reduction state) according to an embodiment.
Figure 1B:
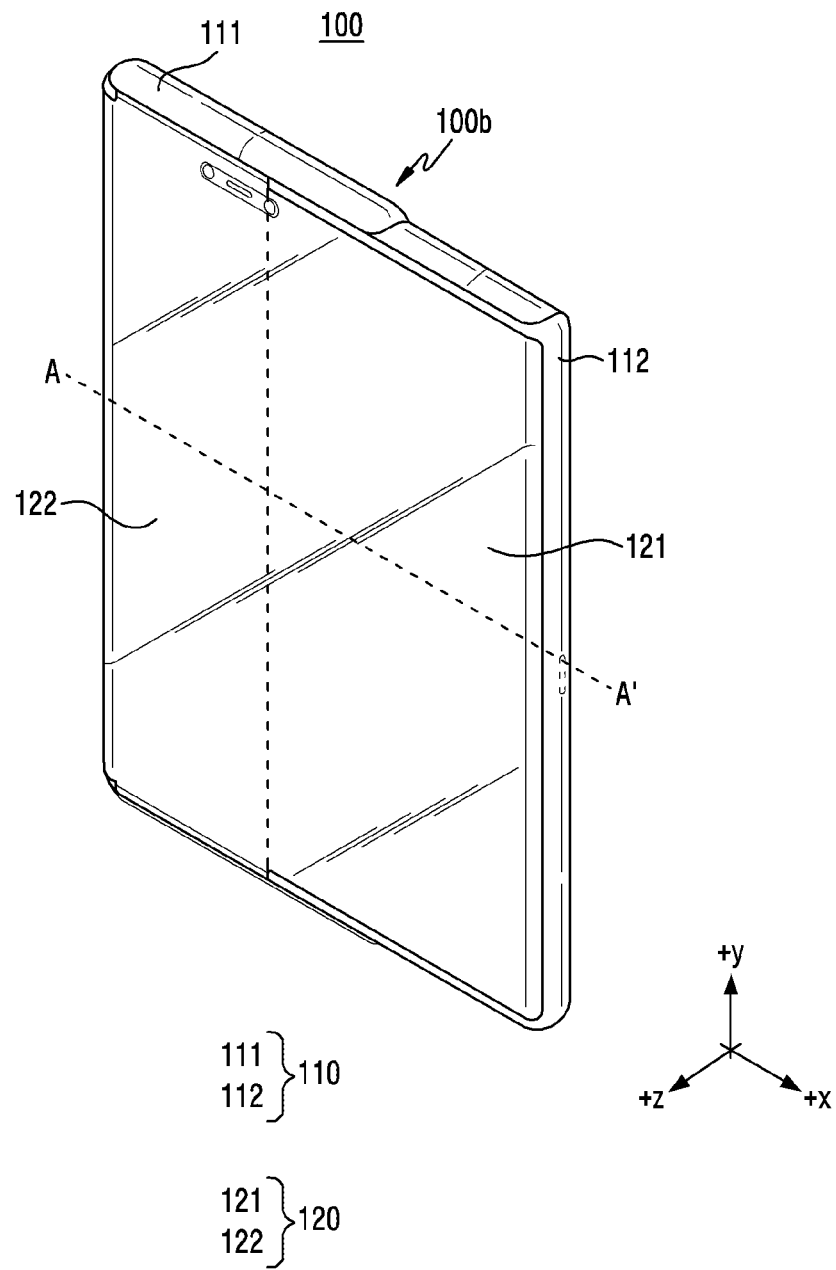
FIG. 1B illustrates a front surface of an electronic device in a second state (e.g., a display area expansion state) according to an embodiment.

FIG. 1A illustrates a front surface of an electronic device in a first state (e.g., a display area reduction state) according to an embodiment. FIG. 1B illustrates a front surface of an electronic device in a second state (e.g., a display area expansion state) according to an embodiment.

Any of the embodiment(s) described herein may be used in conjunction with any other embodiment(s) described herein.

According to various embodiments disclosed herein, a surface facing substantially the same direction as a direction in which at least a portion (e.g., a first portion 121) of a flexible display 120 of an electronic device 100 faces for view by a user(s) may be defined as a front surface of the electronic device 100, and the surface opposite to the front surface may be defined as a rear surface of the electronic device 100. A surface surrounding the space between the front surface and the rear surface may be defined as a side surface of the electronic device 100.

The flexible display 120 may be disposed in at least a portion of the electronic device 100 according to an embodiment. According to an example embodiment, the flexible display 120 may be disposed to include at least a portion having a flat shape and at least a portion having a curved shape. According to an embodiment, the flexible display 120 and a slidable housing 110 surrounding at least a portion of an edge of the flexible display 120 may be disposed on the front surface of the electronic device 100.

According to an example embodiment, the housing 110 (e.g., a slidable-type housing or a rollable-type housing) may configure a partial area of the front surface (e.g., the surface of the electronic device 100 facing a +z direction in FIGS. 1A and 1B) of the electronic device 100, the rear surface (e.g., the surface of the electronic device 100 facing a −z direction in FIGS. 1A and 1B), and the side surface (e.g., the surface connecting between the front surface and the rear surface of the electronic device 100). According to an example embodiment, the housing 110 may configure the rear surface and a partial area of the side surface of the electronic device 100.

According to an example embodiment, the housing 110 may include a first housing 111 and a second housing 112 movably coupled to the first housing 111 in a predetermined range.

According to an example embodiment, the flexible display 120 may include a first display portion 121 which can be coupled to the second housing 112, and a second display portion 122 which extends from at least the first portion 121 and can be drawn into the inside of the electronic device 100.

According to an example embodiment, the electronic device 100 may include a first state 100a and a second state 100b. For example, the first state 100a (e.g., see FIG. 1A) and the second state 100b (e.g., see FIG. 1B) of the electronic device 100 may be determined according to the relative position of the second housing 112 with respect to the first housing 111, and the electronic device 100 may be configured to be changeable between the first state 100a and the second state 100b by a user's manipulation and/or mechanical operation.

According to an example embodiment, the first state 100a of the electronic device 100 may refer to a state before the housing 110 is expanded (e.g., see FIG. 1A). The second state 100b of the electronic device 100 may refer to a state in which the housing 110 is at least partially expanded (e.g., see FIG. 1B).

According to an example embodiment, in a case where the electronic device 100 is switched from the first state 100a to the second state 100b according to the movement of the second housing 112, the second portion 122 of the flexible display 120 may be drawn out (or exposed for view so as to be viewable by a user) from the inside of the electronic device 100 to the outside thereof. According to an example embodiment, the flexible display 120 drawn out (or exposed) may mean that at least a portion of the flexible display 120 is viewable from the outside of the electronic device 100 by a user(s). In an example embodiment, in a case where the electronic device 100 is switched from the second state 100b to the first state 100a according to the movement of the second housing 112 relative to the first housing 111, the second portion 122 of the flexible display 120 may be drawn into the inside of the electronic device 100 so as to no longer be viewable to a user from outside the device. According to an example embodiment, the flexible display 120 drawn into the inside of the electronic device may mean that at least a portion of the flexible display 120 is not visible and/or viewable by a user from the outside of the electronic device 100.

Figure 2A:
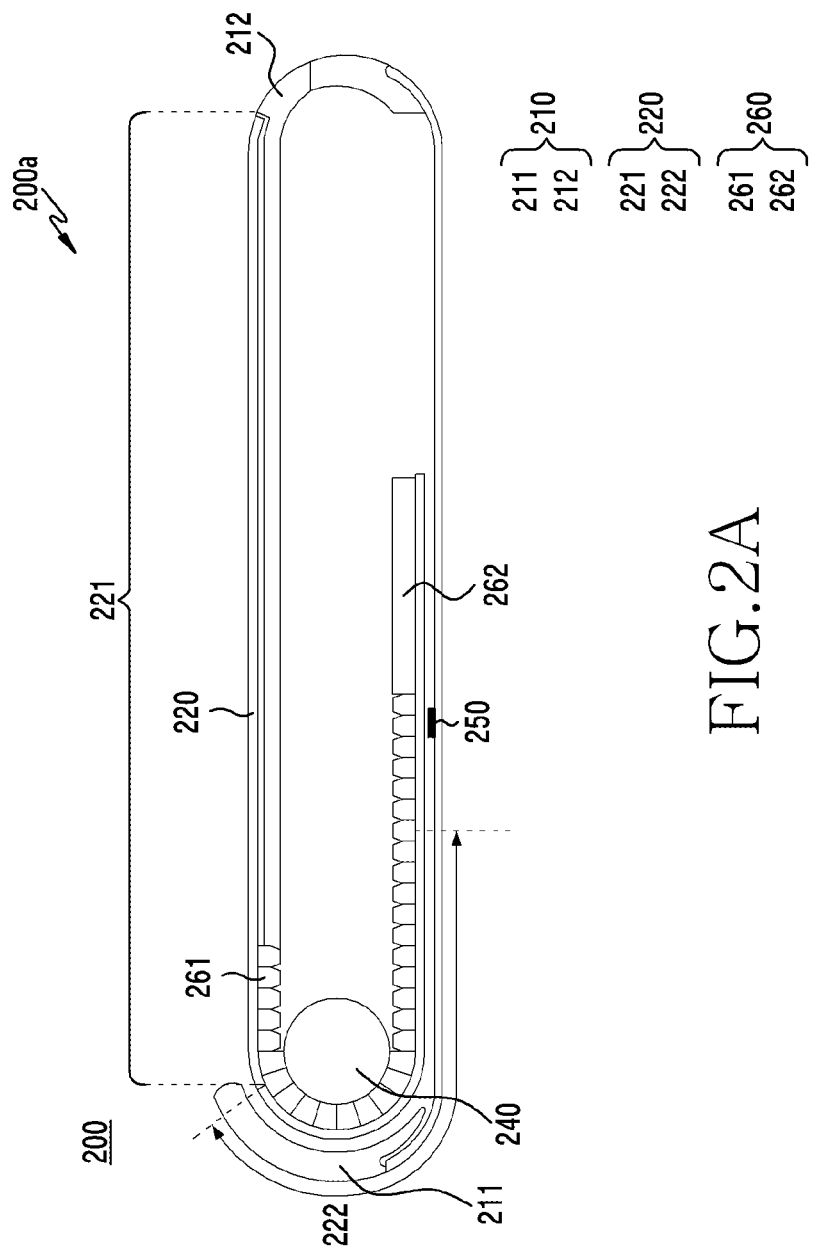
FIG. 2A illustrates a cross-section of an electronic device in a first state (e.g., a display area reduction state) according to an embodiment.
Figure 2B:
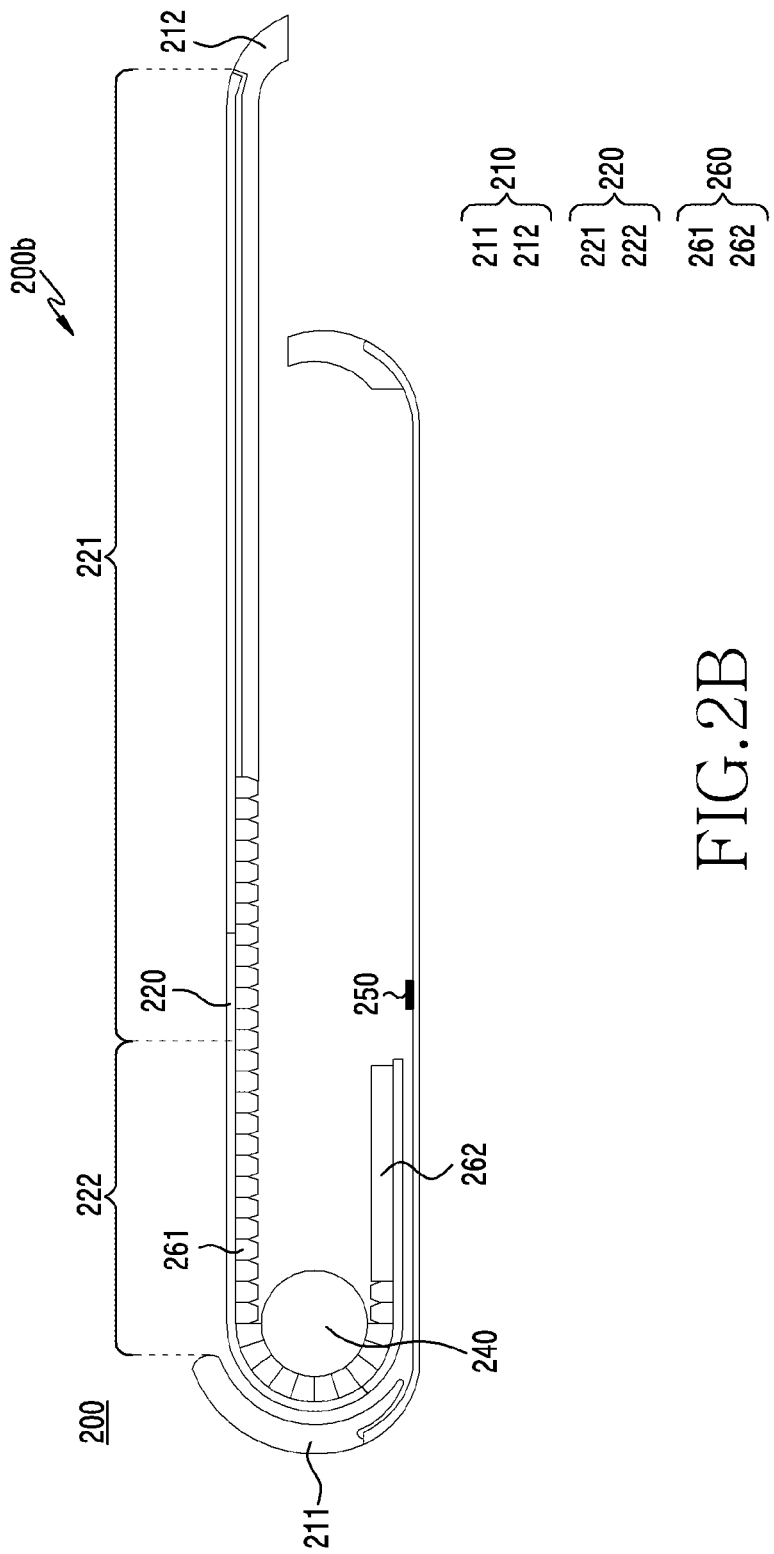
FIG. 2B illustrates a cross-section of an electronic device in a second state (e.g., a display area expansion state) according to an embodiment.

FIG. 2A illustrates a side cross-sectional view of an electronic device in a first state (e.g., a display area reduction state) according to an example embodiment. FIG. 2B illustrates a side cross-sectional view of an electronic device in a second state (e.g., a display area expansion state) according to an example embodiment. In the following description, the description of the electronic device 100 (see above and/or in FIGS. 1A-1B) may be applied to an electronic device 200, and the description of housing 110 may be applicable to housing 210.

According to an example embodiment, the first state may refer to a first shape, and the second state may refer to a second shape. For example, the first shape may include a normal state, a reduced state, and/or a closed state, and the second shape may include an extended state and/or an open state.

Referring to FIGS. 2A and 2B, the electronic device 200 according to an example embodiment may include at least one of a first housing 211, a second housing 212, housing 210 made up of at least housings 211 and 212, a display 220 (including displays and/or display portions 221 and 222), a roller 240, a sensor 250, and a display support member 260.

According to an example embodiment, the first housing 211 may configure at least a portion of a rear surface and/or a side surface of the electronic device 200. According to an example embodiment, the second housing 212 may configure at least a portion of the side surface and/or a front surface of the electronic device 200. According to an example embodiment, the display 220 may be coupled to at least a portion of the second housing 212 so as to move therewith.

According to an embodiment, a partial area of the display 220 may be disposed to overlap the second housing 212. For example, at least a partial area of one surface of the display 220 may be disposed on at least a partial area of the front surface of the second housing 212 and the other surface thereof may be exposed for view to the outside.

According to an example embodiment, the display support member 260 may include a plurality of joint structures 261 and a support plate 262. In an embodiment, a shape of a partial area of the plurality of joint structures 261 may be deformed in a process in which a state of the electronic device 200 is switched. For example, a partial area of the plurality of joint structures 261 may be bent and/or unfolded to have a specified curvature in a process in which the electronic device 200 is switched from a first state 200a to a second state 200b or is switched from the second state 200b to the first state 200a. According to an example embodiment, the second housing 212 may be fixed and/or coupled to one end of the plurality of joint structures 261, and a portion of a first portion 221 of the display 220 may be disposed at an upper end of the second housing 212. In an embodiment, the support plate 262 may be fixed and/or coupled to one end of the plurality of joint structures 261.

According to an embodiment, the roller 240 may be in contact with the plurality of joint structures 261 of the display support member 260, and the display support member 260 may move within a specified range by rotation of the roller 240. For example, in a case where the roller 240 rotates clockwise in a process in which the electronic device 200 is switched from the first state 200a to the second state 200b, the display support member 260 may move in a first direction (e.g., a direction away from the roller 240) while a partial area of the bent joint structures 261 is unfolded. For another example, in a case where the roller 240 rotates counterclockwise in a process in which the electronic device 200 is switched from the second state 200b to the first state 200a, the display support member 260 may move in a second direction (e.g., a direction opposite to the first direction) while a partial area of the unfolded joint structures 261 is bent. According to an embodiment, as a shape of a partial area of the plurality of joint structures 261 is deformed in the process of switching a state of the electronic device 200, a shape of a second portion 222 of the display 220 supported by the plurality of joint structures 261 may also be deformed to correspond to the shape of the plurality of joint structures 261.

According to an example embodiment, the display 220 may be disposed on the outer peripheral surface of the display support member 260, and the display 220 may move together with the display support member 260 by rotation of the roller 240. According to an embodiment, the display 220 may include the first portion 221 and/or the second portion 222, the shape of which may be deformed according to a state of the electronic device 200.

According to an example embodiment, the first portion 221 of the display 220 may be positioned at the upper ends of the second housing 212 and a partial area of the plurality of joint structures 261, and may be supported by the second housing 212 and the plurality of joint structures 261. In an embodiment, the first portion 221 of the display 220 may be exposed for view to the outside of the electronic device 200 regardless of a state (e.g., the first state or the second state) of the electronic device 200.

According to an example embodiment, the second portion 222 of the display 220 may be positioned at the upper end of a partial area of the plurality of joint structures 261 of the display support member 260, and may be supported by the plurality of joint structures 261. In an embodiment, the second portion 222 of the display 220 may be or may not be exposed for view to the outside of the electronic device 200 according to a state of the electronic device 200.

For example, in a case where the electronic device 200 is in the first state 200a, the second portion 222 of the display 220 may be supported by the plurality of joint structures 261 and may be received in an internal space of the electronic device 200 in a state of being wound around a rotation axis of the roller 240, and as a result, the second portion 222 may not be exposed for view to the outside of the electronic device 200. For another example, in a case where the electronic device 200 is switched from the first state 200a to the second state 200b, an area of the second portion 222 of the display 220, the area being adjacent to the first portion 221, may be drawn out from the inside of the electronic device 200. As a partial area of the second portion 222 adjacent to the first portion 221 is drawn out from the inside of the electronic device 200, a display area of the display 220 exposed for view to the outside of the electronic device 200 may be expanded. For another example, in a case where the electronic device 200 is converted from the second state 200b to the first state 200a, an area of the second portion 222 exposed (exposed for view, so as to be viewable by a user(s)) to the outside of the electronic device 200, the area being adjacent to the support plate 262, may be drawn into the inside of the electronic device 200. As a partial area of the second portion 222 adjacent to the support plate 262 is drawn into the inside of the electronic device 200, a display area of the display 220 exposed to the outside of the electronic device 200 may be reduced.

The electronic device 200 according to various embodiments is not limited to the configuration illustrated in FIGS. 2A and 2B. For example, since the display 220 is disposed to cover most of the front surface and a portion of the rear surface of the electronic device 200, a partial area of the display 220 may be exposed to the outside from the rear surface even in the first state 200a.

According to an example embodiment, at least one sensor 250 (which may include sensing circuitry) may be positioned in the electronic device 200. The electronic device 200 may detect a state change of the electronic device 200 using the at least one sensor 250, such as a change from the first state to the second state, or vice versa. The at least one sensor 250 according to an embodiment may include at least one of a Hall sensor and a distance sensor, but is not limited thereto. For example, the at least one sensor 250 may include at least one of an optical sensor, an ultrasonic distance sensor, and a radio wave distance sensor capable of detecting a state (e.g., a state in which the electronic device housing is drawn out or drawn into) of the electronic device 200 or a distance that the housing 212 has moved.

Figure 3:
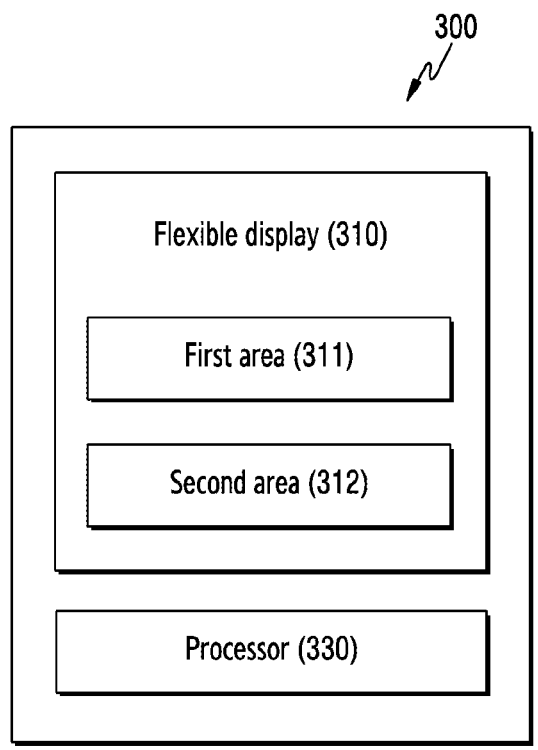
FIG. 3 is a block diagram of an electronic device according to an embodiment.

FIG. 3 is a block diagram of an electronic device according to an example embodiment.

Referring to FIG. 3, an electronic device 300 may at least partially control power (e.g., flexible display panel current) supplied to a flexible display 310 (120, 220) according to a first state (e.g., the first states 100a and 200a in FIGS. 1A and 2A) or a second state (e.g., the second states 100b and 200b in FIGS. 1B and 2B). For example, according to the first state or the second state, the electronic device 300 may supply power related to driving of the flexible display 310 to a partial area (e.g., a first area 311) of the flexible display 310 exposed to the outside through a front surface (e.g., +z direction in FIG. 1A or 1B) of the electronic device 300, and partially supply power related to driving of the flexible display 310 to the remaining area (e.g., a second area 312) which is not exposed for viewing to the outside through the front surface of the electronic device 300. First area 311 may correspond to, for example, at least area 121 and/or 221 above), and second area 312 may correspond to, for example, at least area 122 and/or 222 above).

The electronic device 300 for providing the above-described function may include the flexible display 310 and a processor 330 (including processing circuitry) with reference to FIG. 3. However, the components of the electronic device 300 are not limited thereto. In various embodiments, one of the above-described components may be omitted from the electronic device 300 or the electronic device may further include at least one other component. For example, the electronic device 300 may further include a housing (e.g., the housing 110 of FIGS. 1A, 1B, 2A, and/or 2B) which surrounds at least a portion of an edge of the flexible display 310.

According to an embodiment, in the flexible display 310, according to the first state or the second state, a screen for view may be displayed in the first area 311, and at least a portion of a plurality of portions of the second area 312 may be configured to be in an active state, a black state, or an inactive state. The active state may be a state in which a screen (e.g., a partial screen of the screen displayed in the first area 311) including color data (e.g., an RGB color code) is displayed on at least a portion of the plurality of portions of the second area 312. The black state may be a state in which a screen including no color data or a screen including black color data is displayed in at least a portion of the plurality of portions of the second area 312. The inactive state may be a state in which a screen cannot be displayed in at least a portion of the plurality of portions of the second area 312.

According to an embodiment, in the first state, the flexible display 310 may display a screen with a viewable image (e.g., still or video) in first area 311 such as according to the above-described active state in the first area 311, and display a screen according to the above-described black state in at least a portion of the plurality of portions of the second area 312. For example, in the first state, under the control of the at least one processor 330, power related to driving of the flexible display 310 and power related to color data display of a light-emitting element(s) are supplied to the first area 311, so that the flexible display 310 may display a screen according to the active state in the first area 311. In the first state, under the control of the processor 330, power related to driving of the flexible display 310 is supplied to a portion (e.g., a first portion) adjacent to the first area 311 among the plurality of portions of the second area 312, and power related to color data display of a light-emitting element is blocked, so that the flexible display 310 may display a screen according to the above-described black state in the adjacent portion.

According to an example embodiment, in the second state, the flexible display 310 may display a screen according to the above-described active state in a portion exposed to the outside of the electronic device 300 among the plurality of portions of the second area 312 and the first area 311, and display a screen according to the above-described black state in at least a portion adjacent to the exposed portion, in at least part of a non-exposed area among the plurality of portions of the second area 312. For example, in the second state (e.g., at least partially expanded state), under the control of the processor 330, power related to driving of the flexible display 310 and power related to color data display of a light-emitting element(s) are supplied to a portion (e.g., a second portion, the second portion may include the first portion) exposed to the outside of the electronic device 300 among the plurality of portions of the second area 312 and the first area 311, so that the flexible display 310 may display a screen with image(s) for view according to the above-described active state in the exposed portion among the plurality of portions of the second area 312 and the first area 311. In the second state, under the control of the processor 330, power related to driving of the flexible display 310 is supplied to a portion (e.g., a third portion) adjacent to the exposed portion among the plurality of portions of the second area 312, and power related to color data display of a light-emitting element(s) is blocked, so that the flexible display 310 may display a screen according to the above-described black state in the portion (e.g., non-exposed portion) adjacent to the exposed portion among the plurality of portions of the second area 312. In the above-described embodiment, the second state may be a state in which a portion (e.g., the second portion) of the second area 312 of the flexible display 310 is exposed to the outside through the front surface (e.g., +z-axis direction in FIG. 1B) of the electronic device 300, and the remaining portion (e.g., a portion including the third portion) of the second area is not exposed to the outside through the front surface of the electronic device 300. Thus, in the second state, for example, at least the remaining portion of the second area may be in a black state.

According to an embodiment, the processor 330 may configure at least a partial area (e.g., the second area 312) of the flexible display 310 to be in an active state, a black state, and/or an inactive state, based on whether the device is in for example the first state or the second state. The active state, the black state, and the inactive state may refer to the above-described state of the flexible display 310.

According to an embodiment, in the first state, the processor 330 may configure a portion of the plurality of portions of the second area 312 to be in the above-described black state and configure the remaining portion of the second area 312 to be in the above-described inactive state. For example, in the first state, the processor 330 may supply power related to driving of the flexible display 310 to a portion (e.g., the first portion) adjacent to the first area 311 among the plurality of portions of the second area 312, and block power related to color data display of a light-emitting element(s), and thus display a screen according to the above-described black state in the adjacent portion. In the first state, the processor 330 may block all of power related to driving of the flexible display 310 and power related to color data display of a light-emitting element(s) to the remaining portion among the plurality of portions of the second area 312 other than the portion adjacent to the first area 311, and thus configure the remaining portion of area 312 to be in the above-described inactive state.

According to an embodiment, in the second state, the processor 330 may configure a portion of the plurality of portions of the second area 312 to be in the active state so as to display color image(s) for view by a user(s), and configure the remaining portion to be in the above-described black state or inactive state. For example, in the second state, the processor 330 may supply power related to driving of the flexible display 310 and power related to color data display of a light-emitting element(s) to a portion (e.g., the second portion, the second portion may include the first portion) exposed to the outside of the electronic device 300 for view among the plurality of portions of the second area 312, and thus display a screen according to the active state in the exposed portion of second area 312. In the second state, the processor 330 may supply power related to driving of the flexible display 310 to a portion (e.g., the third portion) adjacent to the exposed portion among the plurality of portions of the second area 312, and block power related to color data display of a light-emitting element(s), and thus display a screen according to the above-described black state in the adjacent portion of second area 312. In the second state, the processor 330 may block all of power related to driving of the flexible display 310 and power related to color data display of a light-emitting element(s) to the non-exposed remaining portion of the second area 312, and thus configure the remaining portion to be in the above-described inactive state.

The above-described active state, black state, and inactive state may be described with reference to Table 1 below for example.

TABLE 1

|  | DDI drive current | Panel drive current | Light-emitting element current | Switching time to active state |
| --- | --- | --- | --- | --- |
| Active state | ON | ON | ON | N/A |
| Black state | ON | ON | OFF | Fast |
| Inactive state | ON | OFF | OFF | Slow |

Referring to Table 1, the processor 330 may configure an active state, a black state, and an inactive state, based on a drive current of a display driver IC (DDI), a drive current of a display panel, and a light-emitting element (e.g., pixel) current. The drive current of the display driver IC may be a power source for driving the display driver IC configured to control an operation of the flexible display 310. The drive current of the display panel may be a power source for driving a gate driver configured to control ON/OFF operations of a light-emitting element (e.g., a pixel) included in the flexible display 310. The light-emitting element current may be a power source for driving a source driver configured to control color data display of a light-emitting element(s) (e.g., pixel(s)) included in the flexible display 310.

According to various example embodiments, in the first state, the processor 330 may supply a drive current of the display driver IC, a drive current of the display panel, and a light-emitting element current to the first area 311 of the flexible display 310, so as to configure the first area 311 to be in an active state for displaying a screen such as with color image(s) for view by a user(s). In the first state, the processor 330 may supply a drive current of the display driver IC and a driver current of the display panel to a portion of the second area 312 of the flexible display 310, this portion being adjacent to the first area 311, according to the active state of the first area 311 of the flexible display 310, and block a light-emitting element(s) current, so as to configure the adjacent portion of the second area 312 to be in the black state which can be quickly converted to the active state based on whether the light-emitting element current(s) is supplied. In the first state, according to the black state for the adjacent portion of the second area 312, the processor 330 may supply (e.g., apply) a drive current of the display driver IC to the remaining portion of the second area 312 of the flexible display 310 other than the adjacent portion, and block a drive current of the display panel and a light-emitting element current, so as to configure the remaining portion of the second area 312 to be in the inactive state. Thus, in the first state (e.g., see FIGS. 1A, 2A), one portion of the second area 312 has panel drive current applied thereto (see black state above), whereas another portion (e.g., remaining portion) of the second area 312 does not (see inactive state above). The remaining portion configured to be in the inactive state may be converted to be in the active state relatively slowly than the adjacent portion. In the first state, the processor 330 may minimize or reduce current consumption for the remaining portion of the second area 312 other than the adjacent portion which may be first exposed to the outside of the electronic device 300.

According to various example embodiments, in the second state, the processor 330 may supply a drive voltage of the display driver IC and a voltage of the display panel to a portion of the second area 312 of the flexible display 310 being exposed to the outside of the electronic device 300 for view by a user, and to the first area 311 of the flexible display 310, and supply a current to a light-emitting element(s), so as to configure the first area 311 and the exposed portion of second area 312 to be in the active state for displaying a screen such as with color image(s) for view by a user. In the second state, the processor 330 may supply a drive current of the display driver IC and a driver current of the display panel to a portion of the second area 312 of the flexible display 310, the portion being adjacent to the exposed portion of the second area 312, according to the active state of the exposed portion and the first area 311 of the flexible display 310, and block a light-emitting element current, so as to configure this adjacent portion of the second area 312 to be in the black state which can be quickly converted to the active state only by whether the light-emitting element current is supplied. In the second state, according to the black state for the adjacent portion of the second area, the processor 330 may supply a drive current of the display driver IC to the remaining portion of the second area 312 of the flexible display 310 other than the adjacent portion, and block a drive current of the display panel and a light-emitting element current, so as to configure the remaining portion to be in the inactive state. The remaining portion configured to be in the inactive state may be converted to be in the active state relatively slowly than the adjacent portion. Thus, in the second state, for example, an exposed portion of the second area 312 may be in the active state, an adjacent portion of the second area 312 that is adjacent the exposed portion may be in a black state, and a remaining portion of the second area 312 which is not adjacent the exposed portion may be in the inactive state (e.g., the adjacent portion may be between the exposed portion and the remaining portion). In the second state, the processor 330 may minimize or reduce current consumption for the remaining portion of the second area 312, other than the adjacent portion which may be first exposed to the outside of the electronic device 300.

According to an example embodiment, the processor 330 may partially supply power related to driving of the flexible display 310 to the second area 312 of the flexible display 310, based on at least a user input. The user input may be an input received through the first area 311 and/or the second area 312 in the first state and/or the second state. In an embodiment, when receiving a user input through the first area 311 or the second area 312 of the flexible display 310, the processor 330 may supply power related to driving of the flexible display 310 to a portion of the second area 312 of the flexible display 310, in response to the received user input. For example, when receiving a user input through the first area 311, in the first state, the processor 330 may supply power related to driving of the flexible display 310 to a portion (e.g., a first portion) adjacent to the first area 311 among a plurality of portions of the second area 312. For another example, when receiving a user input through a portion (e.g., a second portion, the second portion may include the first portion) exposed to the outside of the electronic device 300 among the plurality of portions of the second area 312 or the first area 311, in the second state, the processor 330 may supply power related to driving of the flexible display 310 to a portion (e.g., a third portion) adjacent to the exposed portion.

According to an embodiment, the processor 330 may partially supply power related to driving of the flexible display 310 to the second area 312 of the flexible display 310, based on a user input. The user input may be, for example, a touch input (e.g., drag & drop) of a specified distance, which is received through the first area 311 of the flexible display 310 in order to switch from the first state to the second state. The user input may be an input (e.g., trigger) for activating a motor related to a function of a roller (e.g., the roller 240 of FIG. 2A or 2B) for switching from the first state to the second state. In an embodiment, when receiving a user input through the first area 311 of the flexible display 310, the processor 330 may supply power related to driving of the flexible display 310 to a portion of the second area 312 of the flexible display 310 in response to the received user input, as described above. For example, when receiving a user input through the first area 311, in the first state, the processor 330 may supply power related to driving of the flexible display 310 to a portion (e.g., a third portion) adjacent to a portion (e.g., the second portion) exposed to the outside of the electronic device 300 among the plurality of portions of the second area 312.

According to an example embodiment, the processor 330 may partially block power related to driving of the flexible display 310 to the second area 312 of the flexible display 310, based on a specified period associated with the user input. The user input may be a touch input (e.g., drag & drop) of a specified distance, which is received through the first area 311 of the flexible display 310 in order to switch from the first state to the second state. In an embodiment, when a specified first period has elapsed after the reception of the user input through the first area 311 of the flexible display 310 is ended, the processor 330 may block power related to driving of the flexible display 310 supplied to a portion (e.g., the third portion) of the second area 312 of the flexible display 310, the portion being adjacent to a portion (e.g., the second portion) exposed to the outside of the electronic device 300. In an embodiment, when a position (e.g., a drag end point) of the user input through the first area 311 of the flexible display 310 is maintained for a specified second period, the processor 330 may block power related to driving of the flexible display 310 supplied to a portion (e.g., the third portion) of the second area 312 of the flexible display 310, the portion being adjacent to a portion (e.g., the second portion) exposed to the outside of the electronic device 300.

According to an example embodiment, the processor 330 may determine a range for supplying power related to driving of the flexible display 310 among the second area 312 of the flexible display 310. In an embodiment, the processor 330 may determine the range, based on a time for exposing one of the plurality of portions of the second area 312 to the outside of the electronic device 300 (hereinafter, a sliding time) and a time for supplying power related to driving of the flexible display 310 through the display driver IC (hereinafter, a wake-up time). For example, in a case where the sliding time is 0.2 seconds and the wake-up time is 1 second, the processor 330 may determine, as the range, the number corresponding to a value obtained by dividing the wake-up time by the sliding time (for example, 1/0.2=5).

According to an embodiment, the processor 330 may determine the number for dividing the second area 312 of the flexible display 310 into a plurality of portions. In an embodiment, the processor 330 may determine the number for dividing the second area 312 into a plurality of portions, based on performance (e.g., resolution) related to detection of a sensor (e.g., the sensor 250 of FIGS. 2A and 2B) configured to detect whether the second area 312 of the flexible display 310 is exposed to the outside of the electronic device 300, and a wake-up time of the display driver IC. The number may be the number for dividing the second area 312 into logical sample units in a physically connected state. In various embodiments, the plurality of portions of the second area 312 may include an element disposed in a direction (e.g., +y direction in FIGS. 1A and 1B) perpendicular to a direction (e.g., −x direction in FIGS. 1A and 1B) in which the second area 312 extends from the first area 311, among a plurality of elements (e.g., pixels) arranged on the flexible display 310 to correspond to the position of the second area 312.

Figure 4A:
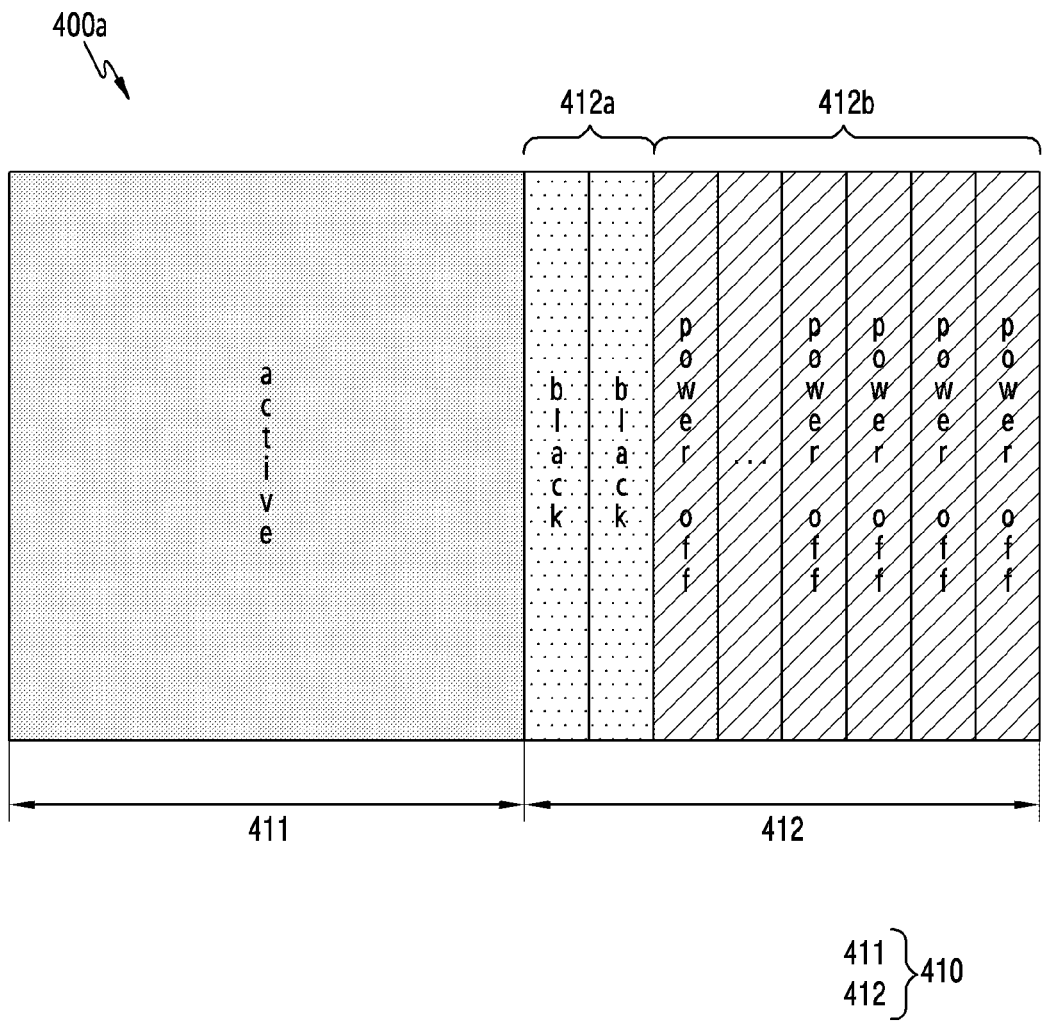
FIG. 4A illustrates an example of a state of a flexible display in a first state (e.g., a display area reduction state) according to an embodiment.

FIG. 4A illustrates an example of a state of a flexible display in a first state (e.g., a display area reduction state) according to an embodiment.

Referring to FIG. 4A, when an electronic device (e.g., the electronic device 300 of FIG. 3) displays a screen in a first area 411 (e.g., 121, 221, 311) of a flexible display 410 (e.g., the flexible display 310 of FIG. 3) in a first state 400a (e.g., the first states 100a and 200a of FIGS. 1A and 2A), the electronic device may supply power related to driving of the flexible display 410 to a portion (e.g., a first portion 412a) of a second area 412 (e.g., 122, 222, 312) of the flexible display 410, this portion being adjacent to the first area 411.

According to an example embodiment, in the first state 400a, a screen (e.g., with color image(s)) may be displayed in the first area 411 of the flexible display 410. For example, a drive current of a display driver IC, a drive current of a display panel, and a light-emitting element(s) current are supplied to the first area 411 with reference to the active state of Table 1 described above, so that a screen may be displayed.

According to an example embodiment, in the first state 400a, power related to driving of the flexible display 410 may be supplied to a portion of the second area 412 of the flexible display 410, the portion being adjacent to the first area 411. For example, in the first state 400a, a drive current of the display driver IC and a drive current of the display panel may be supplied to the first portion 412a among a plurality of portions of the second area 412 with reference to the black state of Table 1 described above. In addition, a light-emitting element current may be blocked to the first portion 412a with reference to the black state of Table 1 described above. In this case, as the electronic device 300 is switched from the first state 400a to a second state (e.g., the second states 100b and 200b of FIGS. 1B and 2B), the electronic device may merely supply only a light-emitting element current to the first portion 412a to quickly display a screen (e.g., with color image(s)) in the first portion 412a.

According to an embodiment, in the first state 400a, power related to driving of the flexible display 410 may be partially blocked to the second area 412 of the flexible display 410. For example, in the first state 400a, only a drive current of a display may be supplied to the second remaining portion 412b among the plurality of portions of the second area 412 other than the first portion 412a and a drive current of the display panel and a light-emitting element current may be blocked to the second remaining portion 412b, with reference to the inactive state of Table 1 described above. In this case, the electronic device 300 may reduce or minimize the current consumed in the second portion 412b relatively farther from the first area 411 as compared to the first portion 412a. In various embodiments, as the flexible display 410 is switched from the first state 400a to the second state 100b or 200b, in a case where a light-emitting element current is supplied to the first portion 412a, a drive current of the display panel may be supplied to at least a portion of the second portion 412b.

According to various embodiments, the electronic device 300 may display a screen in the first area 411 of the flexible display 410 in the first state 400a, and also display a screen on a partial area (e.g., a partial area of the second portion 412b, hereinafter referred to as a "rear active area") of the second area 412 of the flexible display 410 according to the active state of Table 1 described above. In the first state 400a, in a case where a screen according to the active state of Table 1 described above is displayed in the rear active area, power related to driving of the flexible display 410 may be supplied or blocked to an area (e.g., the remaining partial area of the second portion 412b) adjacent to the rear active area. For example, in the first state 400a, in a case where a screen according to the active state of Table 1 described above is displayed in the rear active area, a drive current of the display driver IC and a drive current of the display panel may be supplied to an area located between the rear active area and the first area 411 among areas adjacent to the rear active area, with reference to the black state of Table 1 described above. For another example, in the first state 400a, in a case where a screen according to the active state of Table 1 described above is displayed in the rear active area, only a drive current of the display may be supplied to an area other than the area located between the rear active area and the first area 411 among the areas adjacent to the rear active area, and a drive current of the display panel and a light-emitting element current may be blocked, with reference to the inactive sate of Table 1 described above.

Figure 4B:
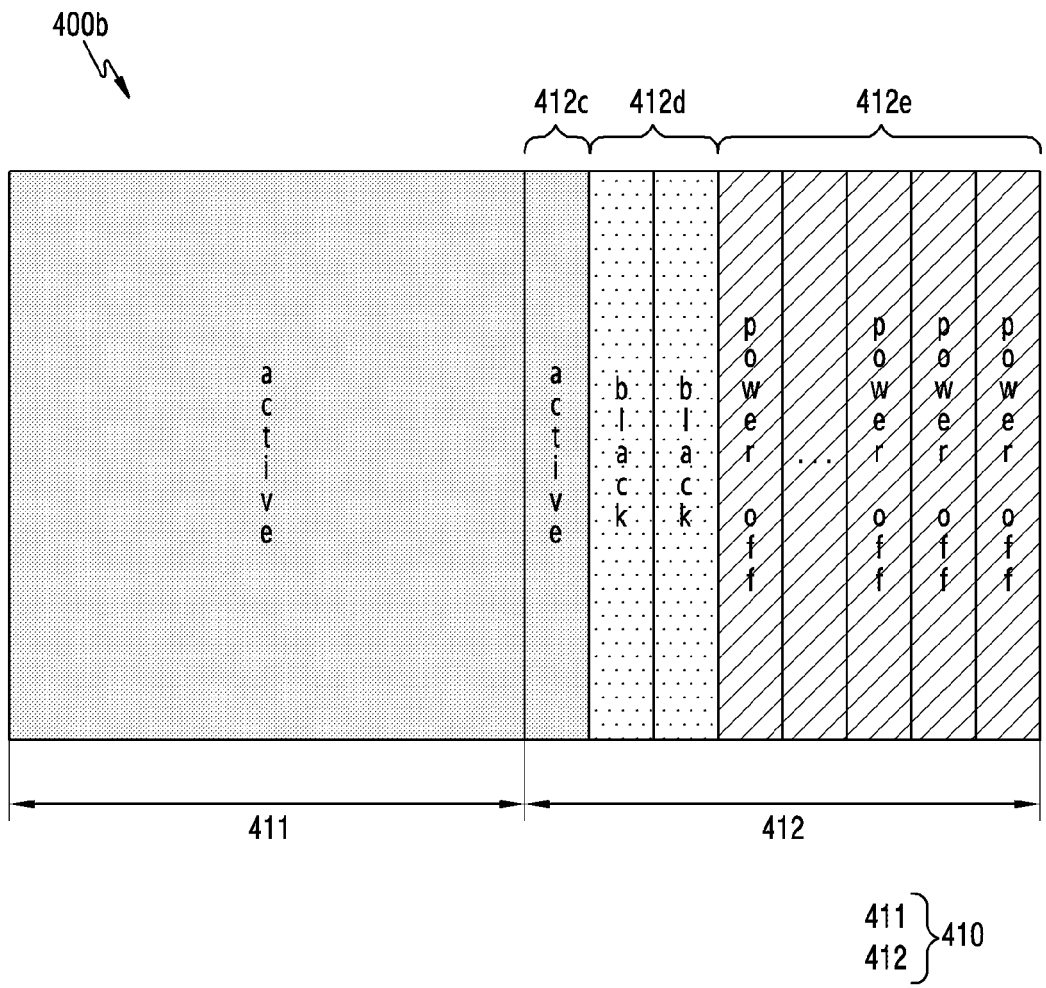
FIG. 4B illustrates an example of a state of a flexible display that is switched from a first state (e.g., a display area reduction state) to a second state (e.g., a display area expansion state) according to an embodiment.

FIG. 4B illustrates a state of a flexible display which is switched from a first state (e.g., a display area reduction state) to a second state (e.g., a partial expansion state) according to an embodiment.

Referring to FIG. 4B, in a case where, in a second state 400b in which a partial area (e.g., a first portion 412c) of the second area 412 of the flexible display 410 (e.g., the flexible display 310 of FIG. 3) is exposed to the outside of the electronic device 300, an electronic device (e.g., the electronic device 300 of FIG. 3) displays a screen (e.g., with color image(s)) on the partial area 412c of the second area 412 exposed to the outside and the first area 411 of the flexible display 410, the electronic device may supply power related to driving of the flexible display 410 to a portion (e.g., a second portion 412d) of the second area 412, the portion being adjacent to the partial area 412c of the second area 412 exposed to the outside.

According to an embodiment, in the second state 400b, a screen may be displayed in the first portion 412c of the second area 412 and the first area 411 of the flexible display 410. For example, a drive current of a display driver IC, a drive current of a display panel, and a light-emitting element current are supplied to the first area 411 and the first portion 412c with reference to the active state of Table 1 described above, so that a screen may be displayed.

According to an embodiment, in the second state 400b, power related to driving of the flexible display 410 may be supplied to a portion of the second area 412 of the flexible display 410, the portion being adjacent to the first portion 412c. For example, in the second state 400b, a drive current of the display driver IC and a drive current of the display panel may be supplied to the second portion 412d among the plurality of portions of the second area 412 with reference to the black state of Table 1 described above. In addition, a light-emitting element current may be blocked to the second portion 412d with reference to the black state of Table 1 described above. In this case, as the electronic device 300 is switched from the second state 400b in which the first portion 412c is exposed to the outside of the electronic device 300 to a state (e.g., the second states 100b and 200b of FIGS. 1B and 2B) in which the second portion 412d adjacent to the first portion 412c is exposed to the outside of the electronic device 300, the electronic device may additionally supply merely a light-emitting element current to the second portion 412d to quickly display a screen in the second portion 412d.

According to an embodiment, in the second state 400b, power related to driving of the flexible display 410 may be partially blocked to the second area 412 of the flexible display 410. For example, in the second state 400b, only a drive current of the display may be supplied to a third portion 412e among the plurality of portions of the second area 412 other than the first portion 412c and the second portion 412d, and a drive current of the display panel and a light-emitting element current may be blocked to the third portion, with reference to the inactive state of Table 1 described above. In this case, the electronic device 300 may reduce or minimize the current consumed in the third portion 412e relatively farther from the first portion 412c as compared to the second portion 412d. In various embodiments, as the flexible display 410 is switched from the second state 400b in which the first portion 412c is exposed to the outside of the electronic device 300 to a state (e.g., the second states 100b and 200b of FIGS. 1B and 2B) in which the second portion 412d adjacent to the first portion 412c is exposed to the outside of the electronic device 300, in a case where a light-emitting element current is supplied to the second portion 412d, a drive current of the display panel may be supplied to at least a portion of the third portion 412e.

Figure 4C:
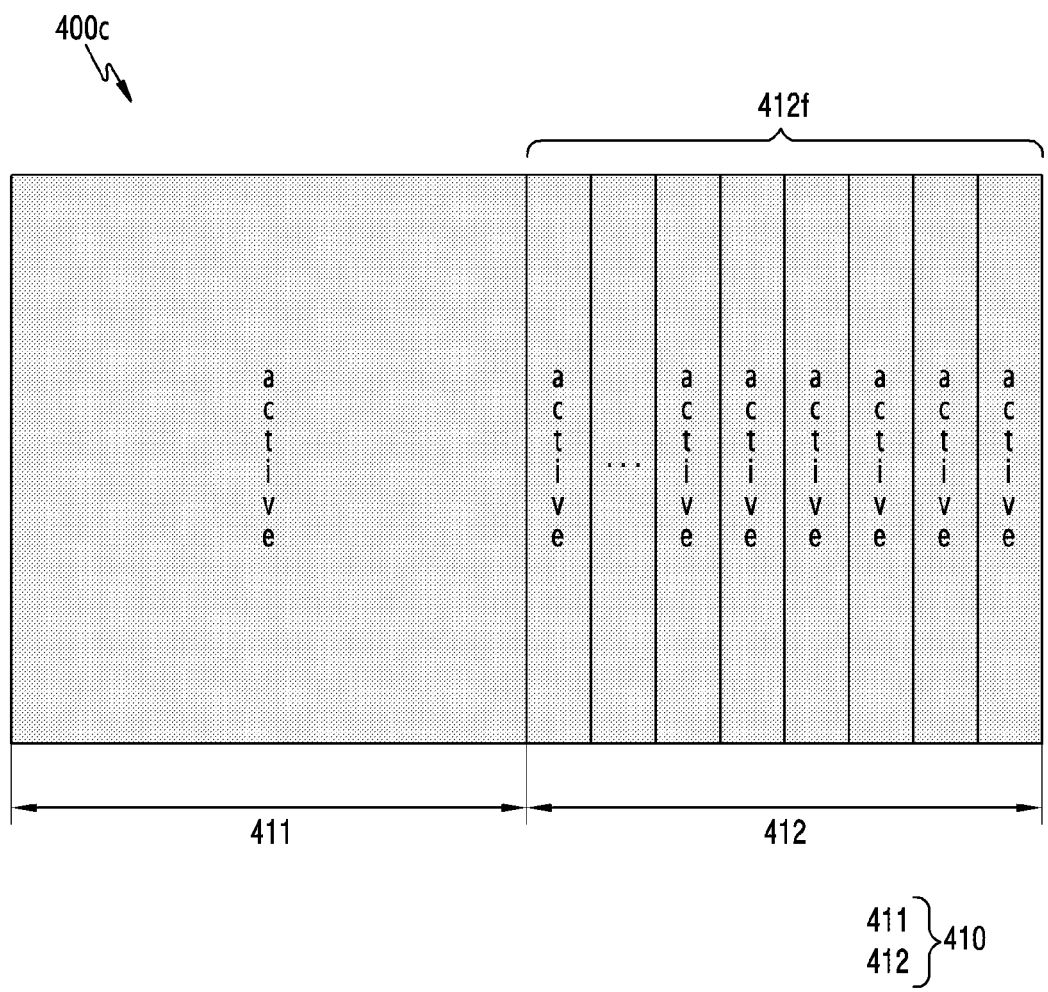
FIG. 4C illustrates an example of a state of a flexible display in a second state (e.g., a display area expansion state) according to an embodiment.

FIG. 4C illustrates an example of a state of a flexible display in a second state (e.g., a display area expansion state) according to an example embodiment.

Referring to FIG. 4C, an electronic device (e.g., the electronic device 300 of FIG. 3) may display a screen in a first area 411 and a second area 412 of the flexible display 410 in a third state 400c (e.g., the second states 100b and 200b of FIGS. 1B and 2B).

According to an embodiment, in the third state 400c, a screen may be displayed in the second area 412 and the first area 411 of the flexible display 410. For example, a drive current of a display driver IC, a drive current of a display panel, and a light-emitting element current are supplied to a plurality of portions 412f of the second area 412 and the first area 411 with reference to the active state of Table 1 described above, so that a screen may be displayed.

According to an embodiment, as the electronic device 300 is switched from the third state 400c to a first state (e.g., the first state 100a of FIG. 1A and the first state 200a of FIG. 2A), the electronic device may partially supply power related to driving of the flexible display 410 to the plurality of portions 412f of the second area 412. For example, in a case where the electronic device 300 is switched from the third state 400c to the first state 100a or 200a, the electronic device may partially supply power related to driving of the flexible display 410 to the plurality of portions 412f with reference to FIG. 4A or 4B.

Figure 5:
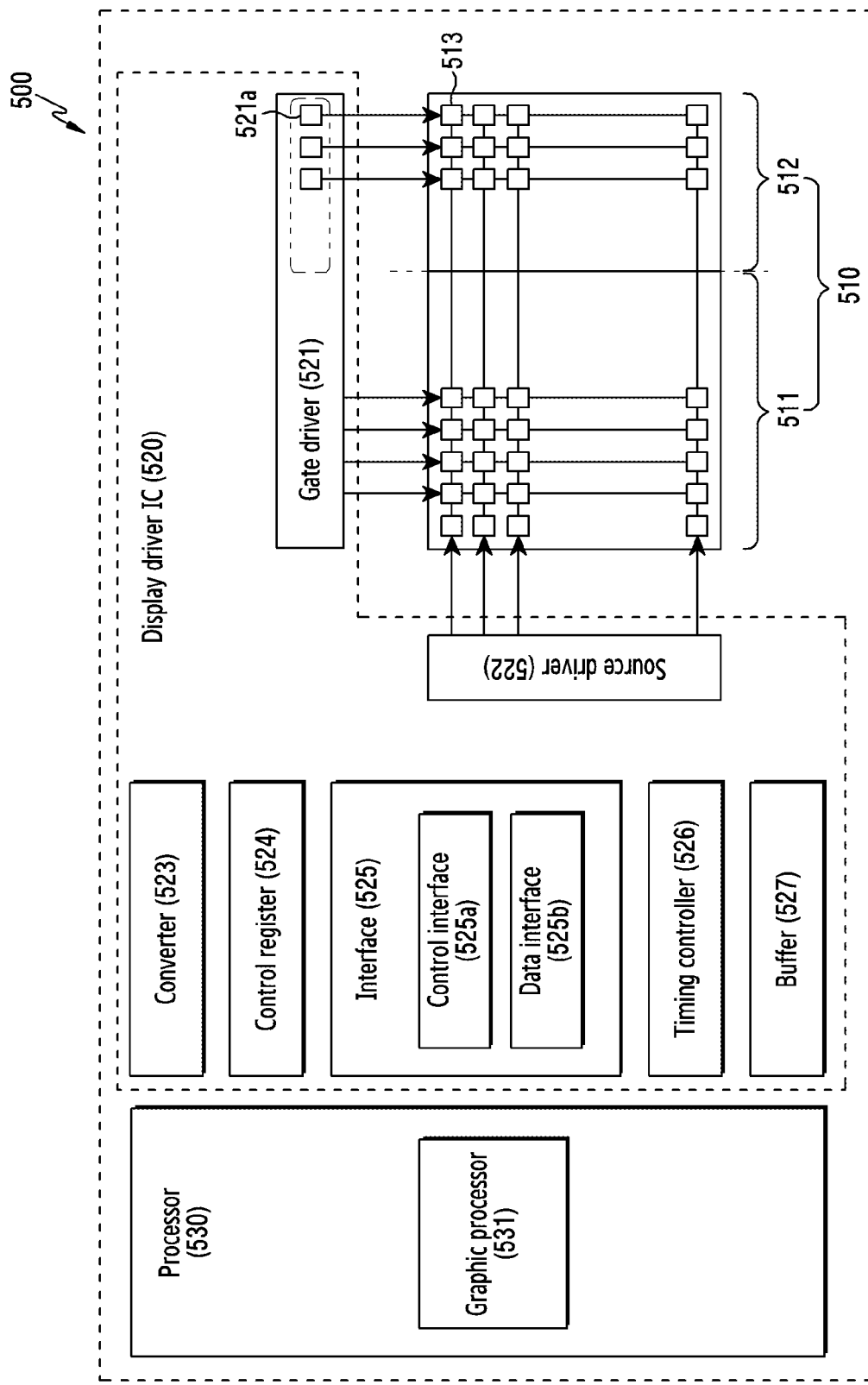
FIG. 5 illustrates a hardware configuration of an electronic device according to various embodiments.

FIG. 5 illustrates a hardware configuration of an electronic device according to various (e.g., 121, 221, 311) embodiments.

Referring to FIG. 5, an electronic device 500 (e.g., the electronic device 300 of FIG. 3) may include a flexible display panel 510, a display driver IC 520, and a processor 530. In various embodiments, one of the above-described components may be omitted from the electronic device 500 or the electronic device may additionally further include at least one other component. For example, the electronic device 500 may further include at least one sensor (e.g., the sensor 250 of FIGS. 2A and 2B) capable of detecting a state change of electronic device 500 (for example, a switch from the first state 100a of FIG. 1A and the first state 200a of FIG. 2A to the second state 100b of FIG. 1B and the second state 200b of FIG. 2B).

According to various embodiments, the flexible display panel 510 (e.g., the flexible display panel 310 of FIG. 3) may include a first display area 511 (e.g., 121, 221, 311) (e.g., the first area 311 of FIG. 3) and a second display area 512 (e.g., 122, 222, 312) (e.g., the second area 312 of FIG. 3). In various embodiments, the second display area 512 may extend in an expansion direction (e.g., -x direction in FIGS. 1A and 1B) of the flexible display panel 510 in a state of being physically connected to the first display area 511. In various embodiments, in the flexible display panel 510, a plurality of light-emitting elements 513 (e.g., pixels) may be arranged in the first display area 511 and the second display area 512 to have a designated shape (e.g., a grid shape).

According to various example embodiments, the display driver IC 520 (including driving circuitry) may control the flexible display panel 510. In various embodiments, the display driver circuit 520 may include a gate driver 521, a source driver 522, a converter 523, a control register 524, an interface 525, a timing controller 526, and a buffer 527. In various embodiments, the display driver IC 520 may be configured by the flexible display panel 510 and one module which may comprise circuitry.

In various embodiments, the gate driver 521 (including driving circuitry) may control power related to driving of the plurality of pixels 513. For example, the gate driver 521 may collectively control the power of the plurality of pixels 513 arranged in the first display area 511 of the flexible display panel 510. For another example, the gate driver 521 may collectively control the power of the plurality of pixels 513 (e.g., hereinafter, pixels in the unit of line) arranged on a substantially straight line in a direction (e.g., +y direction in FIGS. 1A and 1B) perpendicular to the expansion direction of the flexible display panel 510 among the plurality of pixels 513 arranged in the second display area 512 of the flexible display panel 510. In various embodiments, the gate driver 521 may be connected through a switching element 521a for each of the pixels in the unit of line, and thus control the plurality of pixels 513 arranged in the second display area 512 as the pixels in the unit of line. In various embodiments, the operation of the gate driver 521 may be an operation for controlling the drive current of the display panel of Table 1 described above.

In various example embodiments, the source driver 522 may control power related to color data display to display a screen in the first display area 511 and/or the second display area 512 of the flexible display panel 510. For example, the source driver 522 may supply a current corresponding to a value of color data (e.g., a red value) to each of the plurality of pixels 513 arranged in the first display area 511 and the second display area 512. In various embodiments, the source driver 522 may receive a value of color data from the processor 530. In various embodiments, the operation of the source driver 522 may be an operation for controlling the light-emitting element current of Table 1 described above.

In various example embodiments, the converter 523 may supply a drive current to the gate driver 521 and the source driver 522. For example, the converter 523 may convert power supplied from the outside (e.g., a battery) into a fixed voltage and supply the voltage to the gate driver 521 and the source driver 522. In various embodiments, the converter 523 may be a DC-DC converter.

In various embodiments, data (e.g., a command) related to control of the flexible display panel 510 may be stored in the control register 524. For example, the control register 524 may receive data related to control of the flexible display panel 510 from the processor 530 through the interface 525. In various embodiments, the control register 524 may provide data related to control of the flexible display panel 510 to the gate driver 521 and the source driver 522.

In various embodiments, the timing controller 526 may control a timing of transmitting, to the gate driver 521 and the source driver 522, data (e.g., a command) related to control of the flexible display panel 510, the data being stored in the control register 524. For example, the timing controller 526 may allow data for displaying a designated screen to be displayed in the first display area 511 and/or the second display area 512 of the flexible display panel 510 at a designated timing for each of the plurality of pixels 513.

In various embodiments, the buffer 527 may temporarily store data related to control of the flexible display panel 510 in order to compensate for a difference in transmission speed of the data (e.g., a command) related to control of the flexible display panel 510, the data being transmitted from the display driver IC 520 to the flexible display panel 510.

According to various example embodiments, the processor 530 may control a state (e.g., the active state, the black state, or the inactive state of Table 1 described above) of the flexible display panel 510 using the display driver IC 520. For example, the processor 530 (including processing circuitry) may transmit data related to control of the flexible display panel 510 to the display driver IC 520. In various embodiments, the processor 530 may transmit data related to color data display of the plurality of pixels 513 to the display driver IC 520 using a graphic processor 531.

Figure 6:
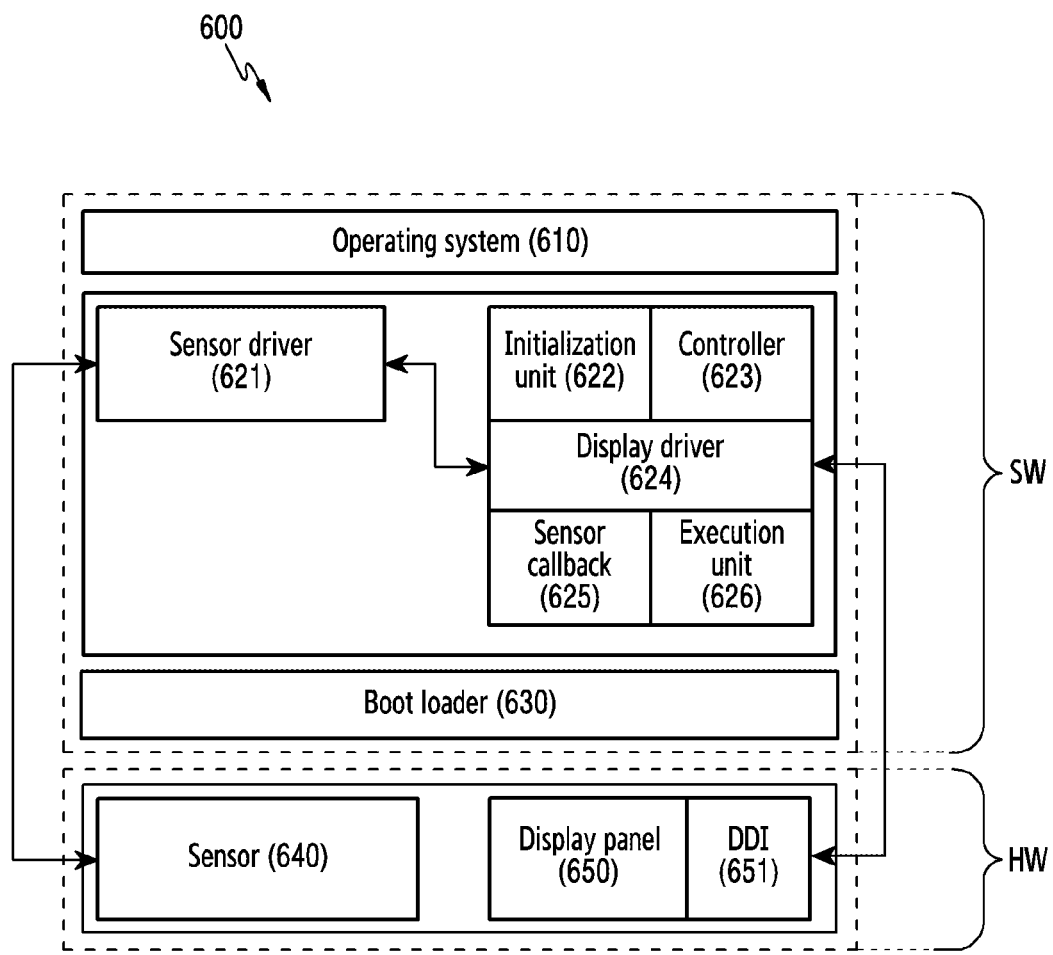
FIG. 6 illustrates a software configuration of an electronic device according to various embodiments.

FIG. 6 illustrates a software inclusive configuration of an electronic device according to various example embodiments.

Referring to FIG. 6, an electronic device 600 (e.g., the electronic device 300 of FIG. 3) may include an operating system 610, a sensor driver 621, an initialization unit (e.g., comprising circuitry) 622, a controller 623, a display driver (e.g., comprising driving circuitry) 624, a sensor callback 625, an execution unit (e.g., comprising circuitry) 626, a boot loader 630, a sensor 640, a display panel 650, and a display driver IC (comprising driving circuitry) 651. In various embodiments, the electronic device 600 may implement the operating system 610, the sensor driver 621, the initialization unit 622, the controller 623, the display driver 624, the sensor callback 625, the execution unit 626, and the boot loader 630 as a software area. In various embodiments, the electronic device 600 may implement the sensor 640, the display panel 650, and the display driver IC 651 as a hardware area.

According to various example embodiments, the operating system 610 may control the components implemented on the hardware area via the components implemented on the software area of the electronic device 600. For example, the operating system 610 may control the display driver IC 651 via the display driver 624.

According to various example embodiments, the sensor driver 621 may determine detection performance (e.g., resolution) for detecting whether a second area (e.g., the second area 312 of FIG. 3) of the display panel 650 (e.g., the flexible display 310 of FIG. 3) is exposed to the outside of the electronic device 600 from the sensor 640 (e.g., the sensor 250 of FIGS. 2A and 2B). In addition, the sensor driver 621 may transmit the detection performance to the display driver 624.

According to various embodiments, the initialization unit 622 may configure an initial state of the display driver 624, based on a configuration value related to the initial configuration of the display driver 624.

According to various embodiments, the controller 623 may determine data (e.g., a current state) related to control of the display panel 650. For example, the controller 623 may calculate power related to driving of the display panel 650 to be supplied to a portion adjacent to a first area (e.g., the first area 311 of FIG. 3) among a plurality of portions of the second area 312 of the display panel 650.

According to various embodiments, the display driver 624 may determine the number for dividing the second area 312 into a plurality of portions, based on the detection performance of the sensor 640 and a wake-up time of the display driver IC 651. In various embodiments, the display driver 624 may include the initialization unit 622, the controller 623, the sensor callback 625, or the execution unit 626.

According to various embodiments, the sensor callback 625 may receive an event related to detection of the sensor 640 and transmit the event to the controller 623. In various embodiments, in relation to the event, the sensor callback 625 may transmit, to the controller 623, a period which has elapsed after reception of a touch input (e.g., drag & drop) of a specified distance received through the first area 311 of the display panel 650 is ended, in order to switch the electronic device 600 from a first state (e.g., the first state 100a of FIG. 1A and the first state 200a of FIG. 2A) to a second state (e.g., the second state 100b of FIG. 1B and the second state 200b of FIG. 2B). In various embodiments, the sensor callback 625 may transmit a sliding time of the display panel 650 and a wake-up time of the display driver IC 651 to the controller 623. In various embodiments, the sensor callback 625 may transmit a user input received through the first area 311 and/or the second area 312 of the display panel 650 to the controller 623.

According to various embodiments, the execution unit 625 may transmit data related to control of the display panel 650 received from the controller 623 to the display driver IC 651.

According to various embodiments, the boot loader 630 may control a signal related to initial driving of at least a partial component (e.g., the display driver 624) of the components implemented on the software area of the electronic device 600.

According to various embodiments, the sensor 640 may detect a state change of the electronic device 600 (for example, a change from the first state 100a or 200a to the second state 100b or 200b). In various embodiments, the sensor 640 may detect whether the second area 312 of the display panel 650 is exposed to the outside of the electronic device 600. In various embodiments, the sensor 640 may include at least one of a Hall sensor and a distance sensor.

According to various embodiments, each of the plurality of portions of the second area 312 of the display panel 650 may be configured to be in an active state, a black state, or an inactive state by the control of the display driver IC 651, with reference to Table 1 described above.

Figure 7:
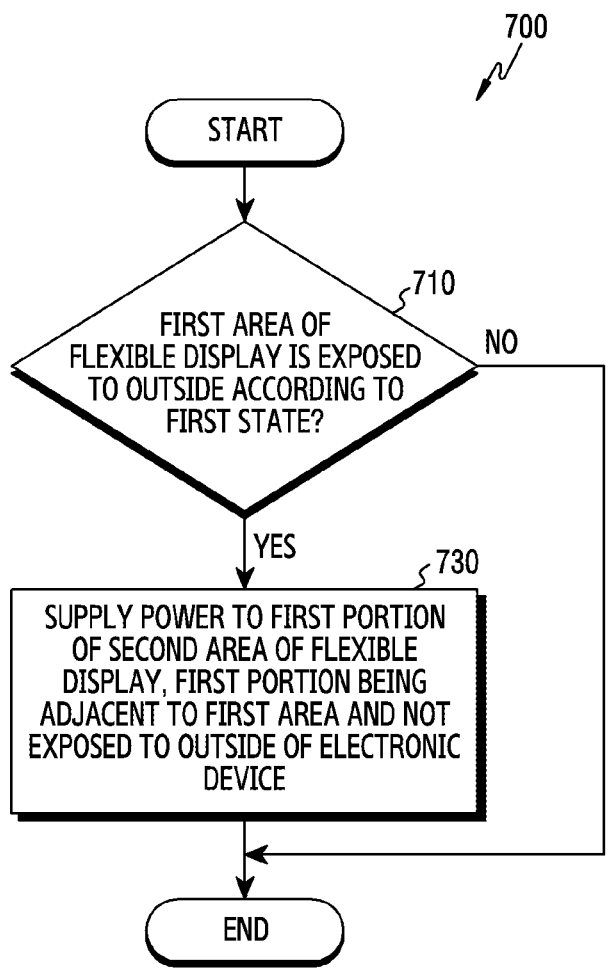
FIG. 7 is a flowchart illustrating a method for controlling a flexible display of an electronic device according to an embodiment.

FIG. 7 is a flowchart 700 illustrating a method for controlling a flexible display of an electronic device according to various example embodiments.

Referring to FIG. 7, an electronic device (e.g., the electronic device 300 of FIG. 3) may perform operations 710 and 730 to at least partially control power supplied to a flexible display (e.g., the flexible display 310 of FIG. 3) according to a first state (e.g., the first state 100a of FIG. 1A and the first state 200a of FIG. 2A) or a second state (e.g., the second state 100b of FIG. 1B and the second state 200b of FIG. 2B).

Referring to operation 710, the electronic device 300 may identify whether a first area (e.g., the first area 311 of FIG. 3) of the flexible display 310 is exposed to the outside through the front surface of the electronic device 300 in the first states 100a and 200a. In an embodiment, in a case where the first area 311 of the flexible display 310 is exposed to the outside, according to the first states 100a and 200a, the electronic device 300 may perform operation 730. In an embodiment, in a case where the first area 311 is not exposed according to the first states 100a and 200a, the electronic device 300 may terminate operation 710 or perform operation 810 of FIG. 8.

Referring to operation 730, the electronic device 300 may supply power related to driving of the flexible display 310 to a portion (e.g., a first portion), such as to portion 412a of the second area 312/412 shown in FIG. 4A, adjacent to the first area 311 among the plurality of portions of the second area 312 of the flexible display 310, and block power related to color data display of a light-emitting element, so as to display a screen in the portion (e.g., 412a) according to the above-described black state in the adjacent portion. In an embodiment, the electronic device 300 may block all of power related to driving of the flexible display 310 and power related to color data display of a light-emitting element to the remaining portion (e.g., 412b) among the plurality of portions of the second area 312 other than the portion adjacent to the first area 311, so as to configure the remaining portion to be in the above-described inactive state.

Figure 8:
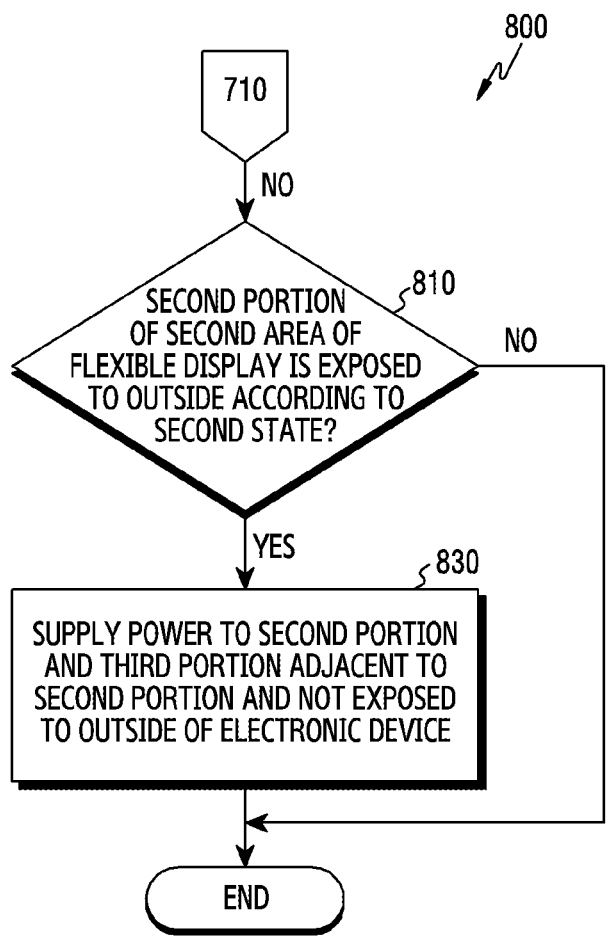
FIG. 8 is a flowchart illustrating a method for controlling a flexible display of an electronic device according to various embodiments.

FIG. 8 is a flowchart 800 illustrating a method for controlling a flexible display of an electronic device according to various example embodiments.

Referring to FIG. 8, an electronic device (e.g., the electronic device 300 of FIG. 3) may perform operations 810 and 830 to at least partially control power supplied to a flexible display (e.g., the flexible display 310 of FIG. 3) according to a first state (e.g., the first state 100*a* of FIG. 1A and the first state 200*a* of FIG. 2A) or a second state (e.g., the second state 100*b* of FIG. 1B and the second state 200*b* of FIG. 2B). In various embodiments, operation 810 may be performed after operation 710.

Referring to operation 810, the electronic device 300 may identify whether a portion (e.g., a second portion) (e.g., portion 412*c* in FIG. 4B) of a second area (e.g., the second area 312 of FIG. 3 and/or second area 412 in FIGS. 4A-4B) of the flexible display 310 is exposed to the outside through the front surface of the electronic device 300 in the second states 100*b* and 200*b*. In an embodiment, in a case where a portion (e.g., 412*c*) of the second area 312/412 of the flexible display 310 is exposed to the outside, according to the second states 100*b* and 200*b*, portion 412*c* may be provided in an active state and the electronic device 300 may perform operation 830. In an embodiment, in a case where a portion of the second area 312 is not exposed according to the second states 100*b* and 200*b*, the electronic device 300 may terminate operation 810 or perform operation 910 of FIG. 9.

Referring to operation 830, in the second states 100*b* and 200*b*, the electronic device 300 may supply power related to driving of the flexible display 310 and power related to color data display of a light-emitting element to a portion (e.g., the second portion) (e.g., 412*c*) of the second area 312/412, the portion being exposed to the outside of the electronic device 300, so as to display a screen according to the above-described active state in the exposed portion 412*c*. In an embodiment, the electronic device 300 may also supply power related to driving of the flexible display 310 to a portion (e.g., a third portion) (e.g., 412*d*) of the second area 312/412, the portion (e.g., 412*d*) being adjacent to the exposed portion (e.g., 412*c*), and block power related to color data display of a light-emitting element, so as to display a screen according to the above-described black state in the adjacent portion (e.g., 412*d*). In an embodiment, the electronic device 300 may block all of power related to driving of the flexible display 310 and power related to color data display of a light-emitting element to the remaining portion (e.g., 412*e*) of the second area 312/412 other than the exposed portion and the adjacent portion, so as to configure the remaining portion to be in the above-described inactive state.

Figure 9:
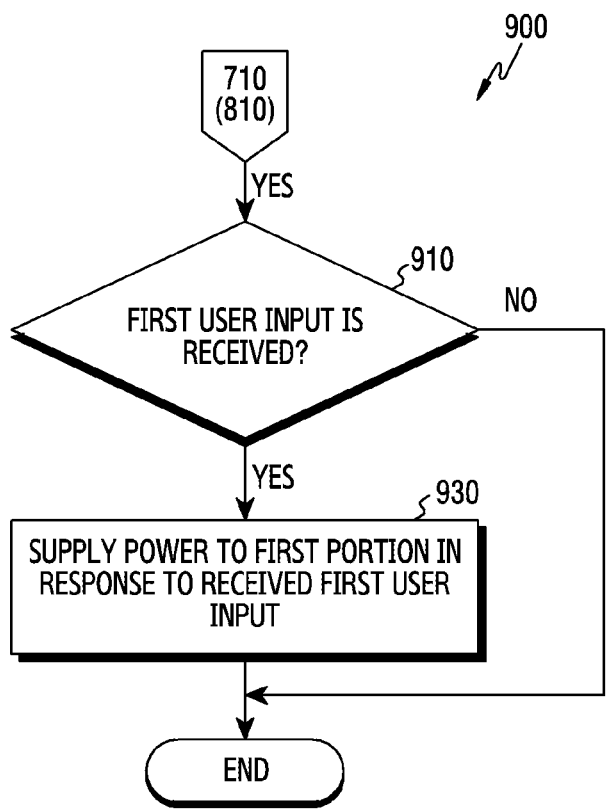
FIG. 9 is a flowchart illustrating a method for controlling a flexible display of an electronic device according to various embodiments.

FIG. 9 is a flowchart 900 illustrating a method for controlling a flexible display of an electronic device according to various example embodiments.

Referring to FIG. 9, an electronic device (e.g., the electronic device 300 of FIG. 3) may perform, based on whether a first user input is received, operations 910 and 930 to partially supply power related to driving of a flexible display (e.g., the flexible display 310 of FIG. 3) to a second area (e.g., the second area 312 of FIG. 3) of the flexible display 310. In various embodiments, operation 910 may be performed after operation 710 of FIG. 7 and/or operation 810 of FIG. 8. The first user input may be a touch input received through a first area (e.g., the first area 311 of FIG. 3) or the second area 312 in a first state (e.g., the first state 100*a* of FIG. 1A and the first state 200*a* of FIG. 2A) or a second state (e.g., the second state 100*b* of FIG. 1B and the second state 200*b* of FIG. 2B).

Referring to operation 910, the electronic device 300 may identify whether the first user input is received through the first area 311 or the second area 312 in the first states 100*a* and 200*a* or the second states 100*b* and 200*b*. In an embodiment, in a case where the first user input is received through the first area 311 or the second area 312 in the first states 100*a* and 200*a* or the second states 100*b* and 200*b*, the electronic device 300 may perform operation 930. In an embodiment, in a case where the first user input is not received through the first area 311 or the second area 312 in the first states 100*a* and 200*a* or the second states 100*b* and 200*b*, the electronic device 300 may terminate operation 910.

Referring to operation 930, in the first states 100*a* and 200*a* or the second states 100*b* and 200*b*, in response to the first user input received through the first area 311 or the second area 312, the electronic device 300 may supply power related to driving of the flexible display 310 to a portion of the second area 312 of the flexible display 310. For example, in a case where the first user input is received through the first area 311 in the first states 100*a* and 200*b*, the electronic device 300 may supply power related to driving of the flexible display 310 to a portion (e.g., a first portion) adjacent to the first area 311 among a plurality of portions of the second area 312. For another example, in a case where the first user input is received through a portion (e.g., a second portion) exposed to the outside of the electronic device 300 among the plurality of portions of the second area 312 or the first area 311 in the second states 100*b* and 200*b*, the electronic device 300 may supply power related to driving of the flexible display 310 to a portion (e.g., a third portion) adjacent to the exposed portion.

Figure 10:
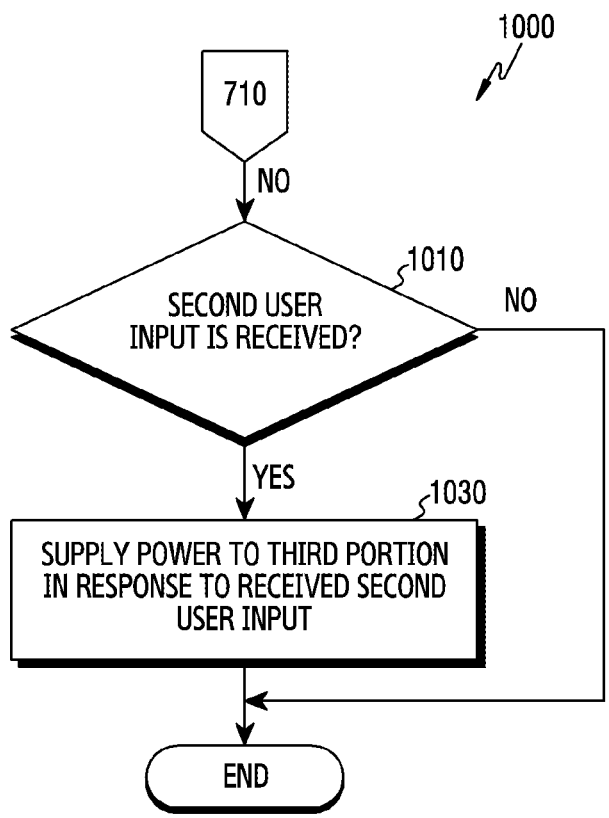
FIG. 10 is a flowchart illustrating a method for controlling a flexible display of an electronic device according to various embodiments.

FIG. 10 is a flowchart 1000 illustrating a method for controlling a flexible display of an electronic device according to various example embodiments.

Referring to FIG. 10, an electronic device (e.g., the electronic device 300 of FIG. 3) may perform, based on whether a second user input is received, operations 1010 and 1030 to partially supply power related to driving of a flexible display (e.g., the flexible display 310 of FIG. 3) to a second area (e.g., the second area 312 of FIG. 3) of the flexible display 310. In various embodiments, operation 1010 may be performed after operation 710 of FIG. 7. The second user input may be a touch input (e.g., drag & drop) of a specified distance, which is received through a first area (e.g., the first area 311 of FIG. 3) of the flexible display 310 to switch from a first state (e.g., the first state 100*a* of FIG. 1A and the first state 200*a* of FIG. 2A) or a second state (e.g., the second state 100*b* of FIG. 1B and the second state 200*b* of FIG. 2B).

Referring to operation 1010, the electronic device 300 may identify whether the second user input is received through the first area 311 in the first states 100*a* and 200*a*. In an embodiment, in a case where the second user input is received through the first area 311 in the first states 100*a* and 200*a*, the electronic device 300 may perform operation 1030. In an embodiment, in a case where the second user input is not received through the first area 311 in the first states 100*a* and 200*a*, the electronic device 300 may terminate operation 1010.

Referring to operation 1030, in the first states 100*a* and 200*a*, in response to the second user input received through the first area 311, the electronic device 300 may supply power related to driving of the flexible display 310 to a portion of the second area 312 of the flexible display 310. For example, in a case where the second user input is received through the first area 311 in the first states 100*a* and 200*a*, the electronic device 300 may supply power related to driving of the flexible display 310 to a portion (e.g., a third portion) adjacent to a portion (e.g., a second portion) exposed to the outside of the electronic device 300 among the plurality of portions of the second area 312.

Figure 11:
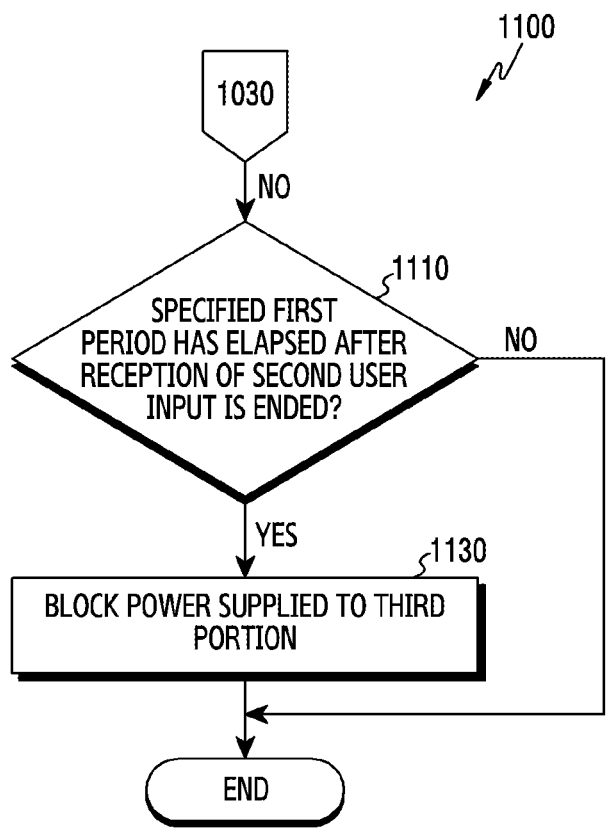
FIG. 11 is a flowchart illustrating a method for controlling a flexible display of an electronic device according to various embodiments.

FIG. 11 is a flowchart 1100 illustrating a method for controlling a flexible display of an electronic device according to various example embodiments.

Referring to FIG. 11, an electronic device (e.g., the electronic device 300 of FIG. 3) may perform, based on a specified period associated with a second user input (e.g., the second user input of FIG. 10), operations 1110 and 1130 in order to partially block power related to driving of the flexible display 310 in a second area (e.g., the second area 312 of FIG. 3) of a flexible display (e.g., the flexible display 310 of FIG. 3). In various embodiments, operation 1110 may be performed after operation 1030.

Referring to operation 1110, the electronic device 300 may identify whether a specified first period has elapsed after the reception of the second user input through the first area 311 of the flexible display 310 is ended. In an embodiment, in a case where the specified first period has elapsed after the reception of the second user input through the first area 311 is ended, the electronic device 300 may perform operation 1130. In an embodiment, in a case where the specified first period has not elapsed after the reception of the second user input through the first area 311 is ended, the electronic device 300 may terminate operation 1110.

Referring to operation 1130, in a case where the specified first period has elapsed after the reception of the second user input through the first area 311 is ended, the electronic device 300 may block power related to driving of the flexible display 310 supplied to a portion (e.g., a third portion) of the second area 312 of the flexible display 310, the portion being adjacent to a portion (e.g., a second portion) exposed to the outside of the electronic device 300.

Figure 12:
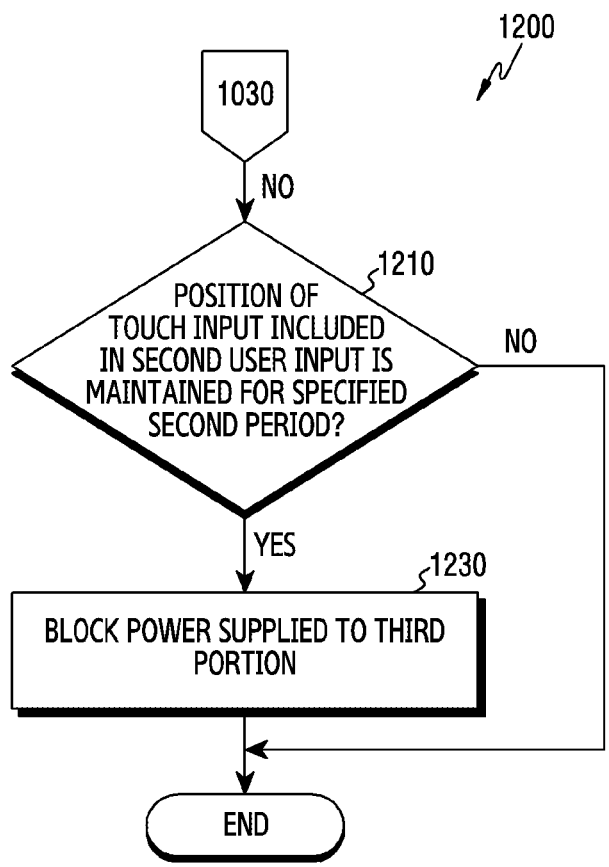
FIG. 12 is a flowchart illustrating a method for controlling a flexible display of an electronic device according to various embodiments.

FIG. 12 is a flowchart 1200 illustrating a method for controlling a flexible display of an electronic device according to various example embodiments.

Referring to FIG. 12, an electronic device (e.g., the electronic device 300 of FIG. 3) may perform, based on a specified period associated with a second user input (e.g., the second user input of FIG. 10), operations 1210 and 1230 in order to partially block power related to driving of the flexible display 310 in a second area (e.g., the second area 312 of FIG. 3) of a flexible display (e.g., the flexible display 310 of FIG. 3). In various embodiments, operation 1210 may be performed after operation 1030.

Referring to operation 1210, the electronic device 300 may identify whether a position (e.g., a drag end point) of a second user input through the first area 311 of the flexible display 310 is maintained for a specified second period. In an embodiment, in a case where the position of the second user input through the first area 311 is maintained for the specified second period, the electronic device 300 may perform operation 1230. In an embodiment, in a case where the position of the second user input through the first area 311 is not maintained for the specified second period, the electronic device 300 may terminate operation 1210.

Referring to operation 1230, in a case where the position of the second user input through the first area 311 is maintained for the specified second period, the electronic device 300 may block power related to driving of the flexible display 310 supplied to a portion (e.g., a third portion) of the second area 312 of the flexible display 310, the portion being adjacent to a portion (e.g., a second portion) exposed to the outside of the electronic device 300.

According to various example embodiments, an electronic device (e.g., the electronic device 300 of FIG. 3) may include a first housing (e.g., the first housing 111 of FIGS. 1A and 1B), a second housing (e.g., the second housing 112 of FIGS. 1A and 1B) coupled with the first housing 111 so as to be movable with respect to the first housing 111, a flexible display (e.g., the flexible display 310 of FIG. 3) including a first area (e.g., the first area 311 of FIG. 3, and/or first area 221, 311, 411) and a second area (e.g., the second area 312 of FIG. 3, and/or second area 122, 222, 412) extending from the first area 311, wherein the first area is exposed to the outside of the electronic device 300 in a first state (e.g., the first state 100a of FIG. 1A, or the first state 200a in FIG. 2A, or the first state 400a in FIG. 4A), and when the first state is switched to a second state (e.g., the second state 100b of FIG. 1B, or the second state 200b in FIG. 2B, or the second state 400b in FIG. 4B) according to the movement of the second housing 112 with respect to the first housing 111, at least a portion (e.g., 412c) of the second area is exposed to the outside of the electronic device together with the first area, and a processor (e.g., the processor 330 of FIG. 3) electrically connected to the flexible display, wherein the processor is configured to, in the first state, supply power related to driving of the flexible display 310 to a first portion (e.g., the first portion 412a of FIG. 4A) of the second area 122/222/312/412, the first portion being adjacent to the first area 221/311/411 and not exposed to the outside through a front surface of the electronic device 300.

According to various example embodiments, the processor 330 may be configured to, in the first state (e.g., 100a), block power related to driving of the flexible display to the remaining portion (e.g., the second portion 412b of FIG. 4A) of the second area other than the first portion (e.g., 412a).

According to various example embodiments, the processor 330 may be configured to, in the second state (e.g., 100b), supply power related to driving of the flexible display (e.g., 310) to a second portion (e.g., the first portion 412c of FIG. 4B) of the second area 122/222/312/412, the second portion (e.g., 412c) being exposed to the outside through the front surface of the electronic device (e.g., 300), and to a third portion (e.g., the second portion 412d of FIG. 4B) of the second area, the third portion (e.g., 412d) being adjacent to the second portion (e.g., 412c) and not exposed to the outside through the front surface of the electronic device (e.g., 300).

According to various embodiments, the processor 330 may be configured to, in the second state 100b, block power related to driving of the flexible display 310 to the remaining portion (e.g., the third portion 412e of FIG. 4B) of the second area 122/222/312/412 other than the second portion (e.g., 412c) and the third portion (e.g., 412d).

According to various embodiments, the processor 330 may be configured to receive a first user input through the first area 311 and/or the second area and/or second portion (e.g., 412c), and supply power related to driving of the flexible display 310 to the first portion (e.g., 412a) or the third portion (e.g., 412d), in response to the received first user input.

According to various embodiments, the processor 330 may be configured to receive a second user input for switching from the first state 100a to the second state 100b, and supply power related to driving of the flexible display 310 to the third portion (e.g., 412d), in response to the received second user input.

According to various embodiments, the processor 330 may be configured to identify whether a specified first period has elapsed after the reception of the second user input is ended, and when the specified first period has elapsed after the reception of the second user input is ended, block power related to driving of the flexible display 310 supplied to the third portion (e.g., 412d).

According to various embodiments, the second user input may include a touch input of a specified distance through the first area 311, and the processor 330 may be configured to identify whether a position of the touch input is maintained for a specified second period, and when the position of the touch input is maintained for the specified second period, block power related to driving of the flexible display 310 supplied to the third portion (e.g., 412*d*).

According to various embodiments, the flexible display 310 may be configured to receive power related to driving of the flexible display 310 by a display driver IC (DDI) (e.g., the display driver IC 520 of FIG. 5), and the processor 330 may be configured to divide the second area 312 into a plurality of portions (e.g., the plurality of portions 412*f* of FIG. 4C) and determine a range of the first portion (e.g., 412*a*), based on a time for exposing one of the plurality of portions (e.g., 412*f*) to the outside through the front surface of the electronic device 300 as the first state 100*a* is switched to the second state 100*b*, and a time for supplying power related to driving of the flexible display 310 through the display driver IC 520.

According to various embodiments, the electronic device may further include a sensor (e.g., the sensor 250 of FIGS. 2A and 2B) for detecting whether at least a portion of the second area 312 is exposed to the outside through the front surface of the electronic device 300 in the first state 100*a* or the second state 100*b*, and the processor 330 may be configured to determine the number of the plurality of portions (e.g., 412*f*), based on performance related to the detection of the sensor 250 and a time for supplying power related to the driving of the flexible display 310 through the display driver IC 520.

According to various embodiments, a method 700 for controlling a flexible display may include an operation (e.g., operation 710 and operation 730 of FIG. 7) of, when a first area 311 of a flexible display 310 is exposed to the outside through a front surface of an electronic device 300 according to a first state 100*a*, supplying power related to driving of the flexible display 310 to a first portion (e.g., 412*a*) of a second area 312 of the flexible display 310, the first portion being adjacent to the first area 311 and not exposed to the outside through the front surface of the electronic device 300.

According to various embodiments, the operation (operation 730) of supplying power related to driving of the flexible display to the first portion may include, in the first state 100*a*, blocking power related to driving of the flexible display 310 to the remaining portion 412*b* of the second area 312 other than the first portion (e.g., 412*a*).

According to various embodiments, the method may include an operation (e.g., operation 810 and operation 830 of FIG. 8) of, when the first state 100*a* is switched to a second state 100*b* according to movement of a second housing 112 with respect to a first housing 111, supplying power related to driving of the flexible display 310 to a second portion (e.g., 412*c*) of the second area 312, the second portion being exposed to the outside through the front surface of the electronic device 300, and to a third portion (e.g., 412*d*) of the second area, the third portion being adjacent to the second portion 412*c* and not exposed to the outside through the front surface of the electronic device 300.

According to various embodiments, the operation (operation 830) of supplying power related to driving of the flexible display 310 to the third portion (e.g., 412*d*) may include, in the second state 100*b*, blocking power related to driving of the flexible display 310 to the remaining portion (e.g., 412*e*) of the second area 312 other than the second portion (e.g., 412*c*) and the third portion (e.g., 412*d*).

According to various embodiments, the method may include an operation (e.g., operation 910 of FIG. 9) of receiving a first user input through the first area 311 or the second portion (e.g., 412*c*), and an operation (e.g., operation 930 of FIG. 9) of supplying power related to driving of the flexible display 310 to the first portion (e.g., 412*a*) or the third portion (e.g., 412*d*), in response to the received first user input.

According to various embodiments, the method may include an operation (e.g., operation 1010 of FIG. 10) of receiving a second user input for switching from the first state 100*a* to the second state 100*b*, and an operation (e.g., operation 1030 of FIG. 10) of supplying power related to driving of the flexible display 310 to the third portion (e.g., 412*d*), in response to the received second user input.

According to various embodiments, the method may include an operation (e.g., operation 1110 of FIG. 11) of identifying whether a specified first period has elapsed after the reception of the second user input is ended, and an operation (e.g., operation 1130 of FIG. 11) of, when the specified first period has elapsed after the reception of the second user input is ended, blocking power related to driving of the flexible display 310 supplied to the third portion (e.g., 412*d*).

According to various embodiments, the second user input may include a touch input of a specified distance through the first area 311, and the method may include an operation (e.g., operation 1210 of FIG. 12) of identifying whether a position of the touch input is maintained for a specified second period, and an operation (e.g., operation 1230 of FIG. 12) of, when the position of the touch input is maintained for the specified second period, blocking power related to driving of the flexible display 310 supplied to the third portion 412*d*.

According to various embodiments, the method may include an operation of dividing the second area 312 into a plurality of portions 412*f*, and an operation of determining a range of the first portion 412*a*, based on a time for exposing one of the plurality of portions 412*f* to the outside through the front surface of the electronic device 300, and a time for supplying power related to driving of the flexible display 310 through a display driver IC 520.

According to various embodiments, the method may include an operation of determining the number of the plurality of portions 412*f*, based on performance related to the detection of a sensor 250 configured to detect whether at least a portion of the second area 312 is exposed to the outside through the front surface of the electronic device 300, and a time for supplying power related to driving of the flexible display 310 through the display driver IC 520.

Figure 13:
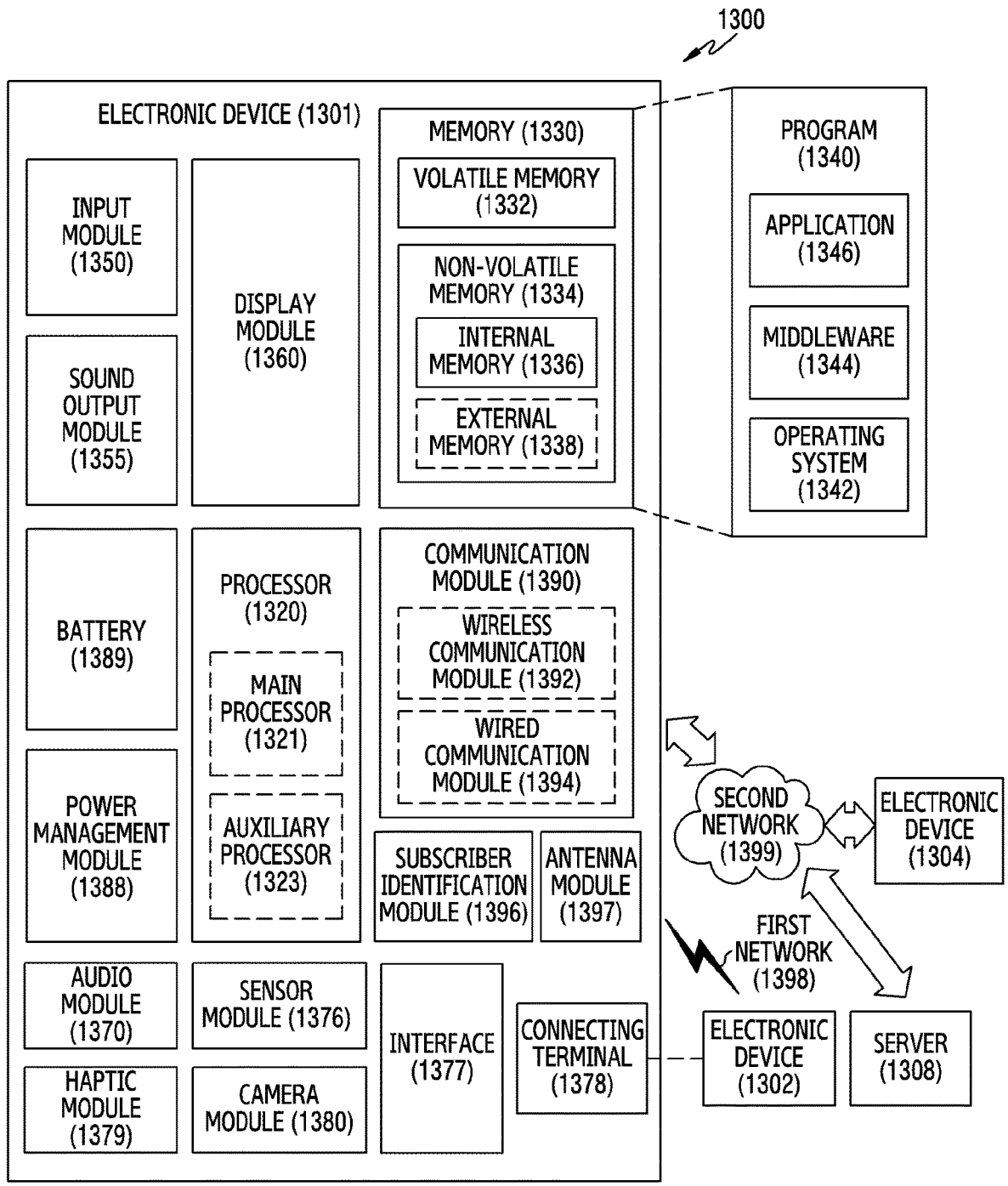
FIG. 13 illustrates an electronic device in a network environment according to an embodiment.

FIG. 13 is a block diagram illustrating an electronic device 1301 in a network environment 1300 according to various embodiments. Referring to FIG. 13, the electronic device 1301 in the network environment 1300 may communicate with an electronic device 1302 via a first network 1398 (e.g., a short-range wireless communication network), or at least one of an electronic device 1304 or a server 1308 via a second network 1399 (e.g., a long-range wireless communication network). According to an embodiment, the electronic device 1301 may communicate with the electronic device 1304 via the server 1308. According to an embodiment, the electronic device 1301 may include a processor 1320, memory 1330, an input module 1350, a sound output module 1355, a display module 1360, an audio module 1370, a sensor module 1376, an interface 1377, a connecting terminal 1378, a haptic module 1379, a camera module 1380, a power management module 1388, a battery 1389, a communication module 1390, a subscriber identification module (SIM) 1396, or an antenna module 1397. Each of these processors and modules (e.g., 1320, 1350, 1355, 1360, 1370, 1376, 1379, 1380, 1388, 1390, 1392, 1396, 1397, etc.) may comprise circuitry. In some embodiments, at least one of the components (e.g., the connecting terminal 1378) may be omitted from the electronic device 1301, or one or more other components may be added in the electronic device 1301. In some embodiments, some of the components (e.g., the sensor module 1376, the camera module 1380, or the antenna module 1397) may be implemented as a single component (e.g., the display module 1360).

The processor 1320 (which includes processing circuitry) may execute, for example, software (e.g., a program 1340) to control at least one other component (e.g., a hardware or software component) of the electronic device 1301 coupled with the processor 1320, and may perform various data processing or computation. According to one embodiment, as at least part of the data processing or computation, the processor 1320 may store a command or data received from another component (e.g., the sensor module 1376 comprising sensing circuitry or the communication module 1390 comprising communication circuitry) in volatile memory 1332, process the command or the data stored in the volatile memory 1332, and store resulting data in non-volatile memory 1334. According to an embodiment, the processor 1320 may include a main processor 1321, comprising processing circuitry, (e.g., a central processing unit (CPU) or an application processor (AP)), or an auxiliary processor 1323 (e.g., a graphics processing unit (GPU), a neural processing unit (NPU), an image signal processor (ISP), a sensor hub processor, or a communication processor (CP)) that is operable independently from, or in conjunction with, the main processor 1321. For example, when the electronic device 1301 includes the main processor 1321 and the auxiliary processor 1323, the auxiliary processor 1323 may be adapted to consume less power than the main processor 1321, or to be specific to a specified function. The auxiliary processor 1323 may be implemented as separate from, or as part of the main processor 1321. Each of these processors (e.g., CPU, AP, GPU, NPU, ISP, CP) preferably comprises processing circuitry.

The auxiliary processor 1323 (e.g., comprising circuitry) may control at least some of functions or states related to at least one component (e.g., the display module 1360, the sensor module 1376, or the communication module 1390) among the components of the electronic device 1301, instead of the main processor 1321 while the main processor 1321 is in an inactive (e.g., sleep) state, or together with the main processor 1321 while the main processor 1321 is in an active state (e.g., executing an application). According to an embodiment, the auxiliary processor 1323 (e.g., an image signal processor or a communication processor) may be implemented as part of another component (e.g., the camera module 1380 or the communication module 1390) functionally related to the auxiliary processor 1323. According to an embodiment, the auxiliary processor 1323 (e.g., the neural processing unit) may include a hardware structure specified for artificial intelligence model processing. An artificial intelligence model may be generated by machine learning. Such learning may be performed, e.g., by the electronic device 1301 where the artificial intelligence is performed or via a separate server (e.g., the server 1308). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1330 may store various data used by at least one component (e.g., the processor 1320 or the sensor module 1376) of the electronic device 1301. The various data may include, for example, software (e.g., the program 1340) and input data or output data for a command related thereto. The memory 1330 may include the volatile memory 1332 or the non-volatile memory 1334.

The program 1340 may be stored in the memory 1330 as software, and may include, for example, an operating system (OS) 1342, middleware 1344, or an application 1346.

The input module 1350 may receive a command or data to be used by another component (e.g., the processor 1320) of the electronic device 1301, from the outside (e.g., a user) of the electronic device 1301. The input module 1350, including input circuitry, may include, for example, a microphone, a mouse, a keyboard, a key (e.g., a button), or a digital pen (e.g., a stylus pen).

The sound output module 1355, including output circuitry, may output sound signals to the outside of the electronic device 1301. The sound output module 1355 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1360, including a display and circuitry, may visually provide information to the outside (e.g., a user) of the electronic device 1301. The display module 1360 may include, for example, a display, a hologram device, or a projector and control circuitry to control a corresponding one of the display, hologram device, and projector. According to an embodiment, the display module 1360 may include a touch sensor adapted to detect a touch, or a pressure sensor adapted to measure the intensity of force incurred by the touch.

The audio module 1370 may convert a sound into an electrical signal and vice versa. According to an embodiment, the audio module 1370 may obtain the sound via the input module 1350, or output the sound via the sound output module 1355 or a headphone of an external electronic device (e.g., an electronic device 1302) directly (e.g., wiredly) or wirelessly coupled with the electronic device 1301.

The sensor module 1376 may detect an operational state (e.g., power or temperature) of the electronic device 1301 or an environmental state (e.g., a state of a user) external to the electronic device 1301, and then generate an electrical signal or data value corresponding to the detected state. According to an embodiment, the sensor module 1376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1377 may support one or more specified protocols to be used for the electronic device 1301 to be coupled with the external electronic device (e.g., the electronic device 1302) directly (e.g., wiredly) or wirelessly. According to an embodiment, the interface 1377 may include, for example, a high definition multimedia interface (HDMI), a universal serial bus (USB) interface, a secure digital (SD) card interface, or an audio interface.

A connecting terminal 1378 may include a connector via which the electronic device 1301 may be physically connected with the external electronic device (e.g., the electronic device 1302). According to an embodiment, the connecting terminal 1378 may include, for example, a HDMI connector, a USB connector, a SD card connector, or an audio connector (e.g., a headphone connector).

The haptic module 1379 may convert an electrical signal into a mechanical stimulus (e.g., a vibration or a movement) or electrical stimulus which may be recognized by a user via his tactile sensation or kinesthetic sensation. According to an embodiment, the haptic module 1379 may include, for example, a motor, a piezoelectric element, or an electric stimulator.

The camera module 1380 may capture a still image or moving images. According to an embodiment, the camera module 1380 may include one or more lenses, image sensors, image signal processors, or flashes.

The power management module 1388 may manage power supplied to the electronic device 1301. According to one embodiment, the power management module 1388 may be implemented as at least part of, for example, a power management integrated circuit (PMIC).

The battery 1389 may supply power to at least one component of the electronic device 1301. According to an embodiment, the battery 1389 may include, for example, a primary cell which is not rechargeable, a secondary cell which is rechargeable, or a fuel cell.

The communication module 1390 may support establishing a direct (e.g., wired) communication channel or a wireless communication channel between the electronic device 1301 and the external electronic device (e.g., the electronic device 1302, the electronic device 1304, or the server 1308) and performing communication via the established communication channel. The communication module 1390 may include one or more communication processors that are operable independently from the processor 1320 (e.g., the application processor (AP)) and supports a direct (e.g., wired) communication or a wireless communication. According to an embodiment, the communication module 1390 may include a wireless communication module 1392 (e.g., a cellular communication module, a short-range wireless communication module, or a global navigation satellite system (GNSS) communication module) or a wired communication module 1394 (e.g., a local area network (LAN) communication module or a power line communication (PLC) module). A corresponding one of these communication modules may communicate with the external electronic device via the first network 1398 (e.g., a short-range communication network, such as Bluetooth™, wireless-fidelity (Wi-Fi) direct, or infrared data association (IrDA)) or the second network 1399 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1392 may identify and authenticate the electronic device 1301 in a communication network, such as the first network 1398 or the second network 1399, using subscriber information (e.g., international mobile subscriber identity (IMSI)) stored in the subscriber identification module 1396.

The wireless communication module 1392 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1392 may support a high-frequency band (e.g., the mmWave band) to achieve, e.g., a high data transmission rate. The wireless communication module 1392 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1392 may support various requirements specified in the electronic device 1301, an external electronic device (e.g., the electronic device 1304), or a network system (e.g., the second network 1399). According to an embodiment, the wireless communication module 1392 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1397 (comprising at least one antenna) may transmit or receive a signal or power to or from the outside (e.g., the external electronic device) of the electronic device 1301. According to an embodiment, the antenna module 1397 may include an antenna including a radiating element of or comprising a conductive material or a conductive pattern formed in or on a substrate (e.g., a printed circuit board (PCB)). According to an embodiment, the antenna module 1397 may include a plurality of antennas (e.g., array antennas). In such a case, at least one antenna appropriate for a communication scheme used in the communication network, such as the first network 1398 or the second network 1399, may be selected, for example, by the communication module 1390 (e.g., the wireless communication module 1392) from the plurality of antennas. The signal or the power may then be transmitted or received between the communication module 1390 and the external electronic device via the selected at least one antenna. According to an embodiment, another component (e.g., a radio frequency integrated circuit (RFIC)) other than the radiating element may be additionally formed as part of the antenna module 1397.

According to various embodiments, the antenna module 1397 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1301 and the external electronic device 1304 via the server 1308 coupled with the second network 1399. Each of the electronic devices 1302 or 1304 may be a device of a same type as, or a different type, from the electronic device 1301. According to an embodiment, all or some of operations to be executed at the electronic device 1301 may be executed at one or more of the external electronic devices 1302, 1304, or 1308. For example, if the electronic device 1301 should perform a function or a service automatically, or in response to a request from a user or another device, the electronic device 1301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1301. The electronic device 1301 may provide the outcome, with or without further processing of the outcome, as at least part of a reply to the request. To that end, a cloud computing, distributed computing, mobile edge computing (MEC), or client-server computing technology may be used, for example. The electronic device 1301 may provide ultra low-latency services using, e.g., distributed computing or mobile edge computing. In an example embodiment, the external electronic device 1304 may include an internet-of-things (IoT) device. The server 1308 may be an intelligent server using machine learning and/or a neural network. According to an embodiment, the external electronic device 1304 or the server 1308 may be included in the second network 1399. The electronic device 1301 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," and/or "circuitry". A module may be a single integral component, or a minimum unit or part thereof, adapted to perform one or more functions. For example, according to an embodiment, the module, which may comprise circuitry, may be implemented in a form of an application-specific integrated circuit (ASIC).

Various embodiments as set forth herein may be implemented as software (e.g., the program 1340) including one or more instructions that are stored in a storage medium (e.g., internal memory 1336 or external memory 1338) that is readable by a machine (e.g., the electronic device 1301). For example, a processor (e.g., the processor 1320) of the machine (e.g., the electronic device 1301) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module and/or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
a first housing;
a second housing coupled with the first housing so as to be movable with respect to the first housing;
a flexible display comprising a first area and a second area extending from the first area, the flexible display configured so that the first area is exposed for view to an outside of the electronic device and the second area is not exposed for view to the outside of the electronic device in a first state, and when the first state is switched to a second state based on at least movement of the second housing with respect to the first housing, at least a portion of the second area becomes exposed for view to the outside of the electronic device together with the first area; and
at least one processor electrically connected to the flexible display,
wherein the at least one processor, individually and/or collectively, is configured to, in the first state, control power supply related to driving of the flexible display differently for the first area, a first portion of the second area adjacent to the first area and a second portion of the second area located farther from the first area that the first portion, so that in the first state: (i) the first area is in an active state, (ii) the first portion of the second area is in a black state, and (iii) the second portion of the second area is in an inactive state.

2. The electronic device of claim 1, wherein the active state is a state in which a panel drive current and a light emitting element current are supplied,
wherein the black state is a state in which the panel drive current is supplied and the light emitting element current is blocked,
wherein the inactivated state is a state in which the panel drive current and the light emitting element current are blocked.

3. The electronic device of claim 1, wherein the at least one processor, individually and/or collectively, is configured to, in the second state, supply power related to driving of the flexible display to a second portion of the second area, the second portion being exposed for view to the outside through a front surface of the electronic device in the second state, and to a third portion of the second area, the third portion being adjacent to the second portion and not exposed for view to the outside through the front surface of the electronic device in the second state.

4. The electronic device of claim 3, wherein the at least one processor, individually and/or collectively, is configured to, in the second state, block power related to driving of the flexible display to the second portion of the second area other than the second portion and the third portion.

5. The electronic device of claim 3, wherein the at least one processor, individually and/or collectively, is configured to
receive a first user input through the first area or the second area, and
supply power related to driving of the flexible display to the first portion and/or the third portion, in response to the received first user input.

6. The electronic device of claim 3, wherein the at least one processor, individually and/or collectively, is configured to:
receive a second user input for switching from the first state to the second state, and
supply power related to driving of the flexible display to the third portion, in response to the received second user input.

7. The electronic device of claim 6, wherein the at least one processor, individually and/or collectively, is configured to:
identify whether a specified first period has elapsed after the reception of the user input is ended, and
when the specified first period has elapsed after the reception of the user input is ended, block power related to driving of the flexible display supplied to the third portion.

8. The electronic device of claim 7, wherein the user input comprises a touch input of a specified distance through the first area, and
the at least one processor, individually and/or collectively, is configured to:
identify whether a position of the touch input is maintained for a specified second period, and
when the position of the touch input is maintained for the specified second period, block power related to driving of the flexible display supplied to the third portion.

9. An electronic device comprising:
a first housing:
a second housing coupled with the first housing so as to be movable with respect to the first housing;
a flexible display comprising a first area and a second area extending from the first area, the flexible display configured so that the first area is exposed for view to an outside of the electronic device and the second area is not exposed for view to the outside of the electronic device in a first state, and when the first state is switched to a second state based on at least movement of the second housing with respect to the first housing, at least a portion of the second area becomes exposed for view to the outside of the electronic device together with the first area; and
at least one processor electrically connected to the flexible display,
wherein the at least one processor, individually and/or collectively, is configured to, in the first state, supply power related to driving of the flexible display to a first portion of the second area, the first portion being adjacent to the first area and not exposed for view to the outside through a front surface of the electronic device,
wherein the flexible display is configured to receive the power related to driving of the flexible display via a display driver IC (DDI), and
the at least one processor, individually and/or collectively, is configured to:
selectively divide the second area into a plurality of portions, and
determine a range of the first portion of the second area, based on at least a time for exposing one of the plurality of portions to the outside through the front surface of the electronic device as the first state is switched to the second state, and a time for supplying power related to driving of the flexible display through the display driver IC.

10. The electronic device of claim 9, further comprising a sensor configured to detect data regarding whether at least a portion of the second area is exposed for view to the outside through the front surface of the electronic device in the first state and/or the second state, wherein the at least one processor, individually and/or collectively, is configured to determine a number of the plurality of portions, based on at least one of the data detected by the sensor, and a time for supplying power related to driving of the flexible display through the display driver IC.

11. A method for controlling a flexible display of an electronic device, the flexible display comprising a first area and a second area extending from the first area, the flexible display configured so that the first area is exposed for view to an outside of the electronic device and the second area is not exposed for view to the outside of the electronic device in a first state, and when the first state is switched to a second state, at least a portion of the second area becomes exposed for view to the outside of the electronic device together with the first area, the method comprising,
when the first area of the flexible display is exposed for view to an outside through a front surface of an electronic device according to the first state, controlling power supply related to driving of the flexible display differently for the first area, a first portion of the second area of the flexible display adjacent to the first area and a second portion of the second area located farther from the first area than the first portion, so that in the first state: (i) the first area is in an active state, (ii) the first portion of the second area is in a black state, and (iii) the second portion of the second area is in an inactive state.

12. The method of claim 11, wherein the active state is a state in which a panel drive current and a light emitting element current are supplied,
wherein the black state is a state in which the panel drive current is supplied and the light emitting element current is blocked,
wherein the inactivated state is a state in which the panel drive current and the light emitting element current are blocked.

13. The method of claim 11, comprising, when the first state is switched to the second state according to movement of a second housing of the electronic device with respect to a first housing of the electronic device, supplying power related to driving of the flexible display to a second portion of the second area, the second portion being exposed for view to the outside through the front surface of the electronic device, and to a third portion of the second area, the third portion being adjacent to the second portion and not exposed for view to the outside through the front surface of the electronic device.

14. The method of claim 13, wherein the supplying of the power related to driving of the flexible display to the third portion comprises, in the second state, blocking power related to driving of the flexible display to the second portion of the second area other than the second portion and the third portion.

15. The method of claim 13, comprising:
receiving a first user input through the first area or the second portion; and
supplying power related to driving of the flexible display to the first portion or the third portion, in response to the received first user input.

16. The method of claim 13, comprising:
receiving a second user input for switching from the first state to the second state; and
supplying power related to driving of the flexible display to the third portion, in response to the received second user input.

17. The method of claim 16, comprising:
identifying whether a specified first period has elapsed after the reception of the second user input is ended; and
when the specified first period has elapsed after the reception of the second user input is ended, blocking power related to driving of the flexible display supplied to the third portion.

18. The method of claim 17, wherein the second user input comprises a touch input of a specified distance through the first area, and
the method comprises:
identifying whether a position of the touch input is maintained for a specified second period; and
when the position of the touch input is maintained for the specified second period, blocking power related to driving of the flexible display supplied to the third portion.

19. A method for controlling a flexible display of an electronic device, the flexible display comprising a first area and a second area extending from the first area, the flexible display configured so that the first area is exposed for view to an outside of the electronic device in and the second area is not exposed for view to the outside of the electronic device a first state, and when the first state is switched to a second state, at least a portion of the second area becomes exposed for view to the outside of the electronic device together with the first area, the method comprising:
when the first area of the flexible display is exposed for view to an outside through a front surface of an electronic device according to the first state, supplying power related to driving of the flexible display to a first portion of the second area of the flexible display, the first portion being adjacent to the first area and not exposed for view to the outside through the front surface of the electronic device;
dividing the second area into a plurality of portions; and
determining a range of the first portion, based on a time for exposing one of the plurality of portions to the outside through the front surface of the electronic device, and a time for supplying power related to driving of the flexible display through a display driver IC.

20. The method of claim 19, comprising determining a number of the plurality of portions, based on performance related to detection of a sensor configured to detect whether at least a portion of the second area is exposed for view to the outside through the front surface of the electronic device, and a time for supplying power related to driving of the flexible display through the display driver IC.

* * * * *